United States Patent [19]
Natarajan

[11] Patent Number: 5,400,371
[45] Date of Patent: Mar. 21, 1995

[54] SYSTEM AND METHOD FOR FILTERING RANDOM NOISE USING DATA COMPRESSION

[75] Inventor: Balas K. Natarajan, Los Gatos, Calif.

[73] Assignee: Hewlett-Packard Company, Palo Alto, Calif.

[21] Appl. No.: 37,774

[22] Filed: Mar. 26, 1993

[51] Int. Cl.6 .................................... H04B 1/66
[52] U.S. Cl. .................... 375/122; 375/103; 382/56; 348/607
[58] Field of Search .............. 375/99, 103, 122; 364/724.01, 724.19; 348/384, 438, 607, 618; 382/56

[56] References Cited

U.S. PATENT DOCUMENTS 4,504,864  3/1985  Anastassiou et al. ............. 348/619

OTHER PUBLICATIONS

Imai et al., "Polygonal Approximations of a Curve—Formulations and Algorithms", *Computational Morphology*, Elsevier Science Publishers, 1988, pp. 71-86.

Suri, Subhashe, "On Some Link Distance Problems in a Simple Polygon", IEEE Transactions on Robotics and Automation, vol. 6, No. 1, Feb. 1990.

Imai et al., "An Optimal Algorithm for Approximating a Piecewise Linear Function", Journal of Information Processing, vol. 9, No. 3, 1986.

*Primary Examiner*—Stephen Chin
*Assistant Examiner*—Don Vo
*Attorney, Agent, or Firm*—Jeffrey Slusher

[57] ABSTRACT

In a system in which a non-random, noise-free signal is disturbed by random noise, one first determines a way to measure the difference between two signals, and one also selects a measure of complexity for signals. Based on a series of discrete values of the noisy signal, a compression processor generates a series of compressed signals representing the noisy signal, each within a corresponding error or loss tolerance of the discrete values of the noisy signal. An optimization processor applies the various loss tolerance values to the compression processor and then evaluates the relative complexity of the corresponding compressed signals. The optimization processor then determines an optimal knee point loss tolerance, below which the complexity of the compressed signals rises rapidly. For continued filtering of the noisy signal, the compression processor compresses the noisy signal using the optimal knee point loss tolerance. The optimally compressed signals are then passed to a decompression processor, which generates a filtered signal corresponding to the noisy signal. In certain embodiments, the optimization processor also controls the sampling rate of the noisy signal; this makes possible a reduction in the residual loss of the filtered signal.

11 Claims, 16 Drawing Sheets

SYSTEM AND METHOD FOR FILTERING RANDOM NOISE USING DATA COMPRESSION

BACKGROUND OF THE INVENTION

1. Field of the Invention

This invention relates to a non-spectral filtering system and method for reducing random noise in signals.

2. Description of the Related Art

Noise plagues almost every modern digital and analog system in which some electrical signal must be transferred from one device to another. A car driver who tries to tune the radio to eliminate as much "static" as possible and the scientist who is attempting to build up a clear picture of a planet from the weak transmission of a distant satellite are both trying to increase the amount of the desired signal they get relative to the amount of undesired noise that accompanies the signal. Because of the great need to reduce the effect of noise, there are a very large number of noise-reduction techniques and systems.

The traditional approach to filtering out noise is spectral, that is, it is based on discovering which frequencies one expects the desired signal to have and then designing filters that remove all other frequencies. In a broad sense, a radio is a type of spectral filter—albeit a very sophisticated one—and is a common example of a device that lets through and amplifies signals within a certain narrow frequency band (corresponding to the selected radio station) and filters out other signals (corresponding to other radio stations or to noise) that aren't "close enough" to the selected frequency.

Spectral filters range from simple networks of common electrical components such as resistors, capacitors, and coils, to complicated digital systems, such as those used for high-speed conversion and transmission of long-distance telephone signals over fiber optic cables or via satellite. The book *Digital Signal Processing*, Oppenheim, A. V. and Schafer, R., Prentice Hall, Englewood Cliffs, N.J. (1974), is but one example of a well-known text that describes the techniques of modern digital signal processing.

Most signals that are processed in digital form start out as analog signals. For example, although there may be pauses in music played by an orchestra, most of the time there is some continuous sound being produced. In order to convert the continuous sound into a form suitable for manipulation by digital circuitry such as a CD player, known techniques are applied to "sample" the continuous sound signal into a series of numerical values. Then, numerical manipulations can be applied to the series to obtain results similar to or better than those one would get using physical analog devices such as capacitors and coils.

Conventional spectral approaches to digital filtering exploit the fact that random noise is distributed over an infinitely wide frequency range, while a noise-free signal is typically concentrated over a finite range of frequencies. Sampling the noisy signal at a high rate and filtering out all frequencies outside the range of frequencies of the noise-free signal thus filters out the noise strength that lies outside of that range. By increasing the sampling rate, increasingly large amounts of the noise can be suppressed.

When the noise-free signal is itself distributed over a large or infinite range of frequencies, very high sampling rates are required for the conventional filter to perform satisfactorily. Yet the noise-free signal may be compactly representable in some other, albeit non-spectral, form. If one could build a filter that worked in such a non-spectral form, a low sampling rate might suffice for satisfactory performance; however, little is known in the prior art about the design or analysis of such filters. In fact, much of the literature is limited to discussions of linear filters, that is, filters whose output bears a linear relation to their input so that scaling the input by a constant factor will cause the output to be scaled by the same factor. Spectral filters are linear filters, and it is widely understood that linear filters are a narrower and less powerful class of filters than non-linear filters.

One object of this invention is to provide a method for the design and realization of non-linear noise filtering systems. The method of the invention holds over a broad class of signals and includes choices that can be made by the user to enable simultaneous control over the sampling rate and the effectiveness of the filtering. Control over the sampling rate is made possible by the inventor's discovery of the link between data compression and noise filtering, used in conjunction with the well understood techniques for tailoring data compression systems to particular applications.

SUMMARY OF THE INVENTION

The invention provides a general method and a system for reducing random noise in signals using data compression according to the principle of Occam's Razor. William of Occam, a 14th century scholastic philosopher, formulated the maxim: "Entia non sunt multiplicanda sine necessitate," ("entities are not to be multiplied unnecessarily"), which is normally interpreted to mean that the simplest explanation of some observed phenomenon is most likely to be correct. Albert Einstein paraphrased this by saying that everything should be simplified as much as possible, but no further.

The invention provides a system for filtering a noisy signal, which includes a desired signal corrupted by random noise. The system comprises a compression processor that has, as an uncompressed input, discrete samples of the noisy signal, and has, as a compressed output, a compressed representation of an approximation signal that differs from the uncompressed input by no more than an adjustable error tolerance as measured by a user-defined metric and is smaller than the uncompressed input in a predetermined complexity measure. The invention also includes a decompression processor that takes, as a compressed input, the compressed representation of the approximation signal and generates, as a decompressed output, the approximation signal.

An optimization processor is also included. The optimization processor has an optimization input that is connected to the compressed output of the compression processor in order to receive the compressed representation of the approximation signal; it also has a tolerance output connected to the compression processor in order to convey to the compression processor the adjustable error tolerance. The optimization processor repeatedly applies to the compression means different values of the adjustable error tolerance, receives the corresponding compressed representations of the approximation signals, and computes in the predetermined complexity measure the complexity value of the compressed representation obtained for each of the error tolerance values; it then selects a knee-point tolerance value.

In a further embodiment, the invention includes a memory unit that contains the discrete samples of the noisy signal.

In yet another embodiment, the invention includes a sampling circuit that takes the noisy signal as its input and generates the discrete values as its output. In this embodiment, the optimization processor is connected to the sampling circuit and controls the sampling rate of the sampling circuit.

The compression processor, the decompression processor, and the optimization processor are preferably a single unit.

The method for filtering the noisy signal according to the invention includes the steps of selecting an error metric and a complexity metric. Then, for each of a plurality of error tolerance values, the system performs the following steps: 1) one of the error tolerance values is selected; 2) in the compression processor, a compressed data signal is generated such that it differs from the noisy signal by no more than the selected error tolerance value according to the selected error metric; and 3) in the optimization processor, for each generated compressed data signal, a corresponding complexity value is calculated using the selected complexity metric. A knee-point error tolerance value is then determined as the value for which the complexity values have maximum acceleration. A running error tolerance rate for the compression processor is then set equal to the knee-point error tolerance value. The noisy signal is thereafter filtered by compressing it in the compression processor with the running error tolerance rate, and decompressing it in a decompression processor.

The step of determining the knee-point (the maximum acceleration of the complexity values) may be accomplished in a number of ways and will depend on the application. Preferred ways include: 1) generating a bilinear approximation of the relationship between the complexity values and the error tolerance values and picking as the knee-point error tolerance value the error tolerance value corresponding to a breakpoint of the bilinear approximation; 2) determining the point at which the second derivative of the complexity/error tolerance curve is a maximum; and 3) generating in the optimization processor a plurality of different sampling rates of the noisy signal and, for each of the plurality of sampling rates, determining the complexity values for compressed signals (generated by the compression processor) for each of the various error tolerance values; the knee-point is then chosen as the point at which the different complexity/error tolerance curves diverge by an amount greater than a user-defined threshold.

DETAILED DESCRIPTION

Random noise is typically more complex than the noise-free signals it disturbs. It is also well known that random noise is hard to compress while ordered information is not. In order to understand the way in which these observations are put to use in the invention, it is helpful to understand the definitions of the terms "signal," "complexity," and "noise." Concerning the terms "signal" and "noise," these concepts are used in the same or similar sense as in other conventional filtering systems. Thus, the noise-free input signal is the stream of desired information one wishes to extract from what one has received; the noise is the part that does not carry desired information and that one wants to get rid of.

Returning to the example of a radio, the signal would be the music one wants to hear and the noise would be the static one wants to eliminate. Of course, those who prefer light orchestral music might well think that hard rock music contains very little desirable "signal" and very much undesirable "noise." From the viewpoint of accurate recording, however, for example on a compact disc, all sound generated by the rock musicians themselves and their instruments could be considered to be the desired signal, and static and other such random disturbances would then be noise.

Unless otherwise indicated, for purposes of this invention, the desired signal will therefore be information whose exact characteristics are unknown, that is generated in either analog or digital form by some source, and whose characteristics one wishes to examine or process further. Noise is then any part of a received signal that does not carry information relating to the characteristics of the desired signal.

As is described in detail below, the complexity is a yardstick that is chosen by the user of the invention depending on the application. Broadly speaking, the complexity C of a signal with respect to a specified tolerance is a measure of the difficulty involved in representing the signal within that tolerance. Examples of possible choices of complexity measures include: 1) the amount of computer memory required to store the signal; 2) the number of frequency components required to represent the signal in a spectral decomposition; or 3) the number of vertices needed to represent it in piecewise linear form. The notions of signal, noise and complexity are illustrated in FIG. 1.

Figure 1:
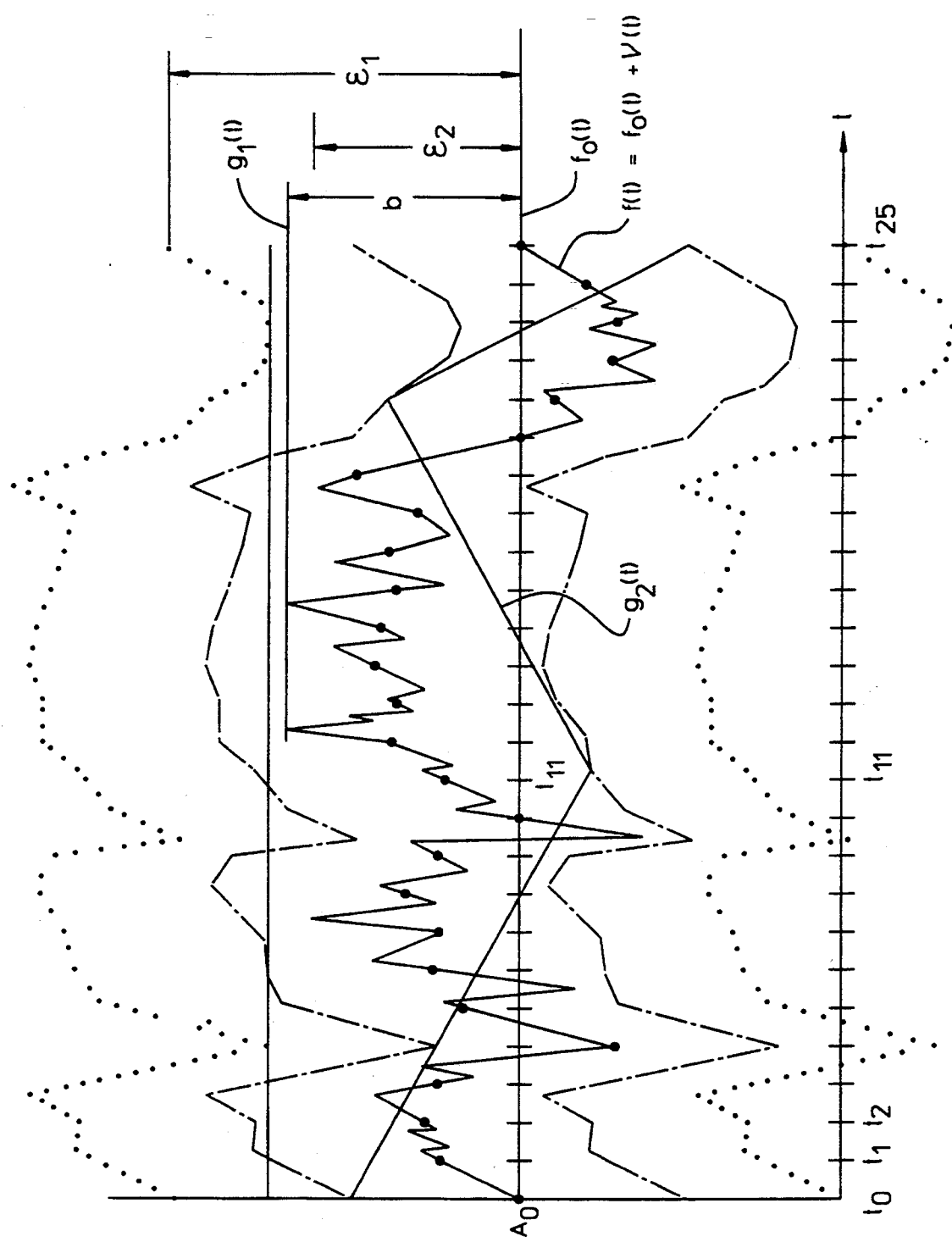
FIG. 1 illustrates a very simple input signal corrupted by noise, and also one practical example of the concept of output complexity and loss tolerance used in the invention.

In FIG. 1, for the sake of illustrative simplicity, the noise-free signal $f_0(t)$ one wants to reconstruct is assumed to be a constant DC signal with amplitude $A_0$. Such a DC signal could occur in many common applications such as in a video camera that is aimed at a surface with a known, uniform color surface for the purposes of calibrating the camera. In such an application, the desired output would correspond to the unchanging video characteristics of the calibration surface, but the actual signal generated by the video camera could be corrupted by noise from internal and external electrical interferences.

The noise-free signal $f_0(t)$ is corrupted by random noise $v(t)$ to create a composite or noisy input signal $f(t)=f_0(t)+v(t)$. In other words, the noisy signal $f(t)$ forms the input signal to the filtering system, whose goal is to filter out the noise $v(t)$ and retain the noise-free signal (DC signal with amplitude $A_0$) as accurately as possible.

The noise illustrated in FIG. 1 has two properties that are common to most noise sources found in practical applications. First, the noise is much more irregular than the underlying signal, that is, it changes more rapidly and thus tends to have more high-frequency components. This is the property that is exploited by spectral filtering systems according to the prior art.

Second, the noise has a finite strength. There is therefore some strength value b such that the amplitude of the noise varies within a band that is no more than 2.b units wide. Uniformly distributed noise has such a maximum and minimum possible value by definition. The invention is not limited, however, to filtering out noise with a finite strength. The assumption of a finite strength b merely makes a rigorous theoretical analysis of the method according to the invention easier; in actual applications, one may not know the distribution of the noise at all, yet the invention can still be used.

As one example, the invention can also be used to filter out noise with a normal or Gaussian probability distribution; such noise has no theoretical maximum or minimum value. (Of course, the physical devices or phenomenon that create the noise will set practical physical limitations on the theoretically infinite distribution.) Even if this were not so, however, analytical demonstration of the advantages of the invention can be made easier simply by establishing maximum noise levels and then discarding "outliers," thus, in essence, truncating the probability distribution curve.

The actual performance of the invention is not dependent on the existence of a noise maximum, but rather only on whether the noise is harder to compress than the signal it disturbs. Truncating distribution curves is merely a convenient way to analyze the invention.

By way of example, in FIG. 1, the noise $v(t)$ is approximately uniformly distributed with a mean of zero and a maximum value of $\pm b$. The invention is not restricted, however, to noise with a zero or constant mean; rather, as is illustrated below, the noise may have a non-zero mean. One of the advantages of this invention is that it is able to filter out noise that has a non-zero mean and even noise whose mean changes within the time interval of the signal to be filtered. Conventional spectral filters are unable to filter out either of these types of noise.

The desire to reproduce the noise-free input signal "as closely as possible" leads to the concept of loss tolerance. In other words, there must be some measure of what is "close enough." Such a measure is described below.

In this particular example, the complexity measure was chosen to be the minimum number of vertices (the number of distinct endpoints of the linear pieces) required to represent the noisy signal in piecewise linear form, within a specified tolerance. In other words, the complexity of a signal with respect to a certain tolerance is the minimum number of pieces required in any piecewise linear function that approximates the noisy signal within the specified tolerance. A piecewise linear function with a minimum number of pieces and within the specified tolerance of the signal is called a minimum link piecewise linear approximation to the signal.

In FIG. 1, there is a series of 26 dots along the "noisy" input signal $f(t)$. These dots indicate the values obtained by sampling the noisy signal 26 times. (This sampling rate is used merely as an example.) The system according to the invention will typically be presented as a series of sampled values that are to be filtered. Assume now that one is prepared to accept an error $\epsilon_1$ much greater than the strength b of the noise $v(t)$. In the example illustrated in FIG. 1, the dotted function curves above and below the noisy function $f(t)$ define an "envelope" that extends $\epsilon_1$ above and below each sampled value of the noisy input function $f(t)$.

In the illustrated example, $\epsilon_1$ is shown as being greater than b. If one is willing to accept an error that is as large as $\epsilon_1$, then any approximating function that remains within the "envelope" will be acceptable. Because the loss tolerance is so great, in the example shown in FIG. 1, any straight line $g_1(t)$ that always remains within the "envelope" will be good enough. Thus, a single straight-line segment $g_1(t)$ with two endpoint vertices is sufficient to approximate the input signal within the tolerance $\epsilon_1$; in this example, the complexity C of the input signal with respect to this tolerance is therefore equal to two.

Assume now that one wishes to reduce the amount of tolerable error to $\epsilon_2$, which, in this example, is less than the strength b of the noise $v$. This means that the "envelope" of acceptability will be narrowed by a factor of two. By adding and subtracting $\epsilon_2$ to each of the sampled values of the noisy input function $f(t)$, the boundaries of this new envelope will fall along the dashed lines shown in FIG. 1.

In order to measure the complexity of the signal at tolerance $\epsilon_2$, it remains to construct a minimum link approximation, that is, a piecewise linear function that lies within the boundaries of this envelope and consists of a minimum number of pieces. Constructing such a minimum link approximation can be achieved using the specialized but well-understood technique of visibility polygons.

In their articles "An Optimal Algorithm for Approximating a Piecewise Linear Function," J. of Information processing, Vol. 9, No. 3, pp. 159–62, 1986; and "Polygonal Approximations of a Curve—Formulations and Algorithms," *Computational Morphology*, pp. 71–86, Elsevier Science Publishers, 1988, H. Imai and M. Iri disclose a computationally efficient method for finding a piecewise linear function that fits as error envelope and consists of the smallest number of pieces. S. Suri also discloses a similar method in a more general setting in his paper: "On some link distance problems in a simple polygon," IEEE Transactions on Robotics and Automation, 1990.

In essence, the method of Imai and Iri starts at the vertical left boundary of the envelope and finds the farthest point of the envelope that can be seen from this boundary. Linking this point to the left boundary gives the first segment in the piecewise linear approximation. Starting from this point one proceeds farther into the envelope to find successive segments, until the right vertical boundary is reached.

In FIG. 1, such a piecewise linear approximation is shown as $g_2(t)$. Notice that $g_2(t)$ is with $\epsilon_2$ of each of the sample points. Also note that $g_2$ has three pieces, and four vertices; hence the complexity of the signal at tolerance $\epsilon_2$ is four.

As one further reduces the tolerance, the complexity of the signal increases. When the tolerance is zero, the approximating function simply connects the input points. In the illustrated example, the approximation that simply connects the input points would have 25 pieces and hence 26 vertices; thus at a tolerance of zero ($\epsilon = 0$), the complexity C of the signal is 26.

Referring again to FIG. 1, notice that the approximating function $g_1$ is smoother than $g_2$, which in turn is smoother than would be the function that simply connected the sampled input points. In fact, one can construct a family of such functions, each of which has minimum complexity for a particular value of the tolerance. This invention provides a system and a method for selecting the filtered function from such a family.

Figure 2:
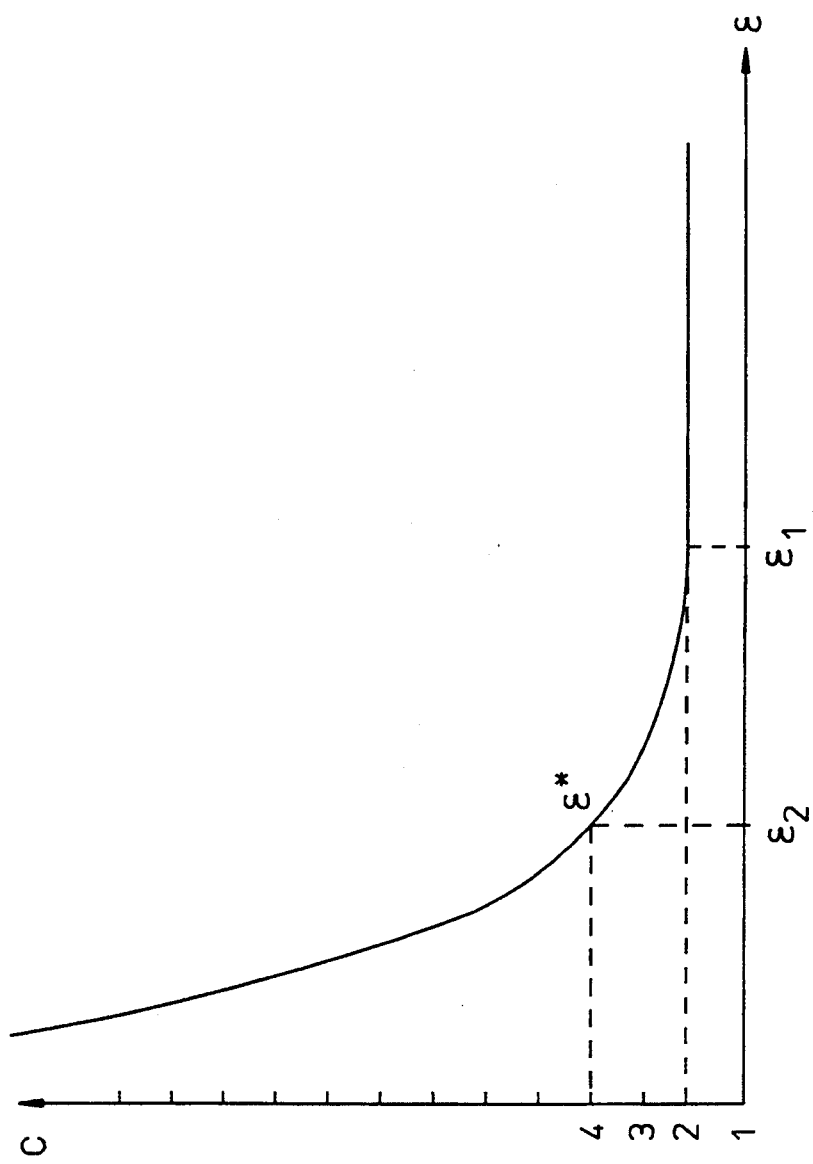
FIG. 2 is a simplified qualitative graph showing the relationship between output complexity and loss tolerance for signals corrupted by random noise.

FIG. 2 is a graph that illustrates the way in which complexity C depends on the selected loss tolerance $\epsilon$. In this illustrated example, complexity is defined as the number of line segments needed to represent the noisy input signal within the given error envelope. Other complexity measures, may, however, also be used, as is discussed in greater detail below.

FIG. 2 shows the qualitative relationship between the loss tolerance e and the complexity C: for high values of loss tolerance, the complexity asymptotically approaches a minimum value (in the example shown if FIG. 1, the minimum value is two, since at least two vertices are needed). Below a certain "knee point" $\epsilon^*$ however, the complexity rises rapidly. The inventor has discovered not only that this qualitative relationship holds for a large class of complexity measures, but also that the knee point $\epsilon^*$ usually is or is at least close to the strength b of the random noise itself. The inventor has also discovered that the approximating function that has minimum complexity at a value of the tolerance equal to the knee point ($\epsilon = \epsilon^*$) is a best choice for the filtered output signal.

As a more general description of the method of the invention, assume that one is given a noisy signal that has random noise $v(t)$ added to it with a strength b. Assume also that one has a "black box" that is able to compress data according to some known scheme such as the piecewise linear approximation method described above. Assume further that the black box has a knob that controls the amount of loss or error that the compression scheme must not exceed and that one is going to pay attention to the position of the knob when using the black box to compress the noisy signal.

To start with, one sets the knob with a large loss or error. The output of the black box then does not follow the signal very closely, although it will represent the signal very simply. In other words, much compression will have been achieved in that the size of the output will be small, but a lot of information will be lost. As the amount of allowable loss is reduced, the output of the box will begin to track the signal increasingly accurately, the size of the output (the degree of complexity of the representation) will increase, and more information will be retained. When the error tolerance is equal to the strength b of the noise, the output of the box will begin to follow the noise itself rather than just the noise-free signal. As the loss tolerance is reduced further, the size of the output (the degree of complexity) rises sharply, since random noise is hard to compress. It is this phenomenon that gives rise to the knee point illustrated in FIG. 2.

Figure 3:
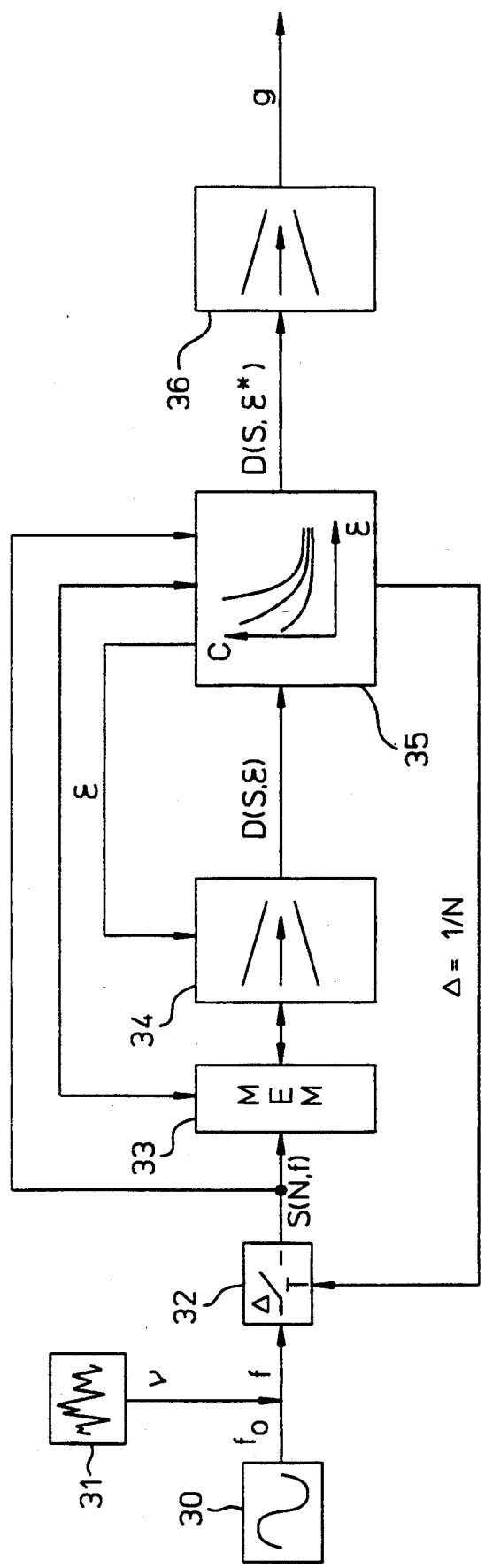
FIG. 3 is a block diagram of the filtering system according to the invention.

Assume now that the knob of the black box is set to the value of the noise strength b and consider the output from the box. It might be thought that the noise and the loss would add to one another so that if one were to decompress the compressed output of the black box, the resulting decompressed signal would be 2.b away from the noise-free signal. The inventor has discovered, however, that the allowed loss tends to cancel the noise and that the extent of the cancellation depends on how often the signal is sampled; the inventor explains this phenomenon in "Occam's Razor for Functions," B. Natarajan, Proceedings of the 6th Annual ACM Conference on Computational Learning Theory," pp. 370-76, Santa Cruz, Calif., 26-28 July 1993, FIG. 3 is a block diagram that illustrates the main components of the filtering system according to the invention. A signal source 30 creates a noise-free, desired signal $f_0$, which is disturbed by the output $v$ from a noise source 31 to form a noisy input signal f. The signal source 30 will be any device that generates some form of signal that one wishes either to store or to transmit to another device. Examples of signal sources would be electrocardiogram ECG monitors, voice synthesis and transmission systems, and such devices as telefax machines that generate signals in digital form. The noise source 31 may be internal, such as thermal and electrical disturbances within a video camera, or may be external such as electrical noise on transmission line from the signal source 30.

The invention is not limited to filtering signals received in the time domain. Rather, any collection of data that can be compared according to some metric with an observed or calculated signal can be filtered using the invention.

The noisy input signal f(t) is sampled by a conventional sample-and-hold (S/H) circuit 32 that has a sampling period $\Delta$ that is equal to the reciprocal of the sampling rate N. In applications in which the signal source 30 is a digital device, the S/H circuit 32 will typically be omitted. The S/H circuit 32 generates as its output a sampled or digitized noisy input signal S(N,f) whose values are stored in a memory 33. Referring also to FIG. 1, the values stored in the memory 33 thus correspond to the values of the noisy signal f(t) marked with dots.

The memory unit 33 is not necessary for storing discrete values of the noisy signal and may be omitted if the compression scheme used by the compression processor 34 does not require blocks of data points in order to generate a compressed representation of its input signal. The Imai and Iri compression scheme is an example of such a "real-time" compression routine. In such cases, the compression processor 34 could operate directly on the stream of incoming discrete values of the noisy signal. Similarly, assuming the noise characteristics of the noisy signal do not change during the time for which the optimization processor is determining the knee point $\epsilon^*$, it too would be able to operate without having discrete values of the noisy signal stored in a separate memory unit 33.

The values of the sampled noisy input signal $S(N,f)$ stored in the memory 33 are passed as input signals to a compression processor 34. The compression processor 34 may be a known device such as a microprocessor that takes a given loss or error tolerance parameter $\epsilon$ and outputs the parameters of a compressed representation $D(S,\epsilon)$ of the sampled and stored input function $S(N,f)$.

One example of the compression processor 34 would be a processor that operates using the Imai and Iri method to generate the parameters of a piecewise linear approximation of an input function as is described above and illustrated in FIG. 1. Another example of a compression processor would be a device that computes an approximate but reduced spectral transform of the sampled and stored signal values. Typically, such a processor would compute the Discrete Fourier Transform of the samples and then discard some terms in the transform. In this case, a measure of complexity could be the number of frequency terms retained by the processor.

Other compression routines may be used in the invention. For example, given the series of sampled function values $S(N,f)$, the compression processor 34 could also generate a polynomial or piecewise polynomial approximation of the input function. In such case, the measure of complexity could be the amount of memory space needed to store the coefficients of the various polynomials, the highest order of any of the polynomials, or any combination of these or other characteristics of the approximating polynomials. Observe that a compression routine that approximates the input function using a series of piecewise linear functions is simply a special case of a piecewise polynomial compression routine in which the order of the highest-order polynomial is fixed at one and the measure of complexity is the number of polynomials (line segments) needed in the representation. Still other compression routines may generate approximations based on exponential functions, or on some combination of exponential, trigonometric, polynomial, or other class of functions.

The parameters representing the function approximation to the sampled input signal are passed to an optimization processor 35 that may in some applications also act as a supervisory processor for the operation of the S/H circuit 32, the memory unit 33, and the compression processor 34. The optimization processor 35 may similarly be a microprocessor or other conventional programmable device with standard timing and memory circuitry. Indeed, in some applications, the compression processor 34, the optimization processor 35, and/or the decompression processor 36 (see below) could all be implemented as a single device.

The optimization processor 35 is either connected to the S/H circuit 32 in a conventional manner in order to control the sampling period $\Delta$ (or, equivalently its inverse, the sampling rate N), or it has access to the collection of sampled noisy values stored in the memory unit 33. The optimization processor 35 may also control the S/H circuit 32 directly and gate it at the desired sampling frequency. In other words, the optimization processor 35 preferably controls the rate at which the S/H circuit 32 samples the noisy input signal f, or the number of sampled values that the compression processor operates on.

The optimization processor 35 is also connected to the memory unit 33 in a conventional manner so that it can store and retrieve values in the memory unit 33. The memory unit 33 may also contain the operating instructions for the optimization processor 35 and the compression processor 34; other internal or external devices may, however, be used.

The optimization processor 35 is also connected to the compression processor 34 in order to pass to it a loss or error tolerance parameter $\epsilon$ and to instruct the compression processor 34 to retrieve sampled input values from the memory unit 33 and to generate its compressed functional approximation parameters $D(S,\epsilon)$. The optimization processor is thus able to initiate sampling with a predetermined sampling rate N by the S/H circuit 32, to select an error or loss tolerance $\epsilon$, and to receive the parameters of a compressed functional approximation based on the sampled function values within the selected error tolerance $\epsilon$.

As is described below in greater detail, the optimization processor 35 directs the compression processor 34 to generate functional approximations for a series of error or loss tolerance values $\epsilon$ until it determines at least the approximate position of the knee point $\epsilon^*$, that is, the error tolerance below which the complexity begins to rise rapidly. As is also discussed below, the optimization processor 35 may also direct the S/H circuit 32 and the compression processor 34 to generate function approximations for different actual or simulated sampling rates (by not using every sampled value).

After examining a series of approximations (functions, each corresponding to a point on the $\epsilon$-C "curve"), the optimization processor selects the functional representation corresponding to the approximation at the knee point $\epsilon^*$. At this point, assuming the noise characteristics affecting the desired signal remain approximately the same, the optimization processor can hold the value $\epsilon$ at $\epsilon=\epsilon^*$ and then let the compression processor operate on subsequent sampled portions of the noisy input signal without further calibration.

In other words, once the optimization processor 35 has determined the knee point value $\epsilon^*$, it could simply pass through the compressed function parameters from the compression processor 34 to a decompression processor 36, which reconstructs an approximating function g based on these parameters $D(S,\epsilon^*)$. Given the vertices of piecewise linear function approximations, the decompression processor "connects the vertices" to form a continuous approximating signal. Given a set of included frequency components (see FIG. 17 below and the related discussion for a more detailed description of such an application), the decompression processor 36 would synthesize and combine the various frequency components to generate a filtered output signal g.

Since the compression processor 34 is able to generate approximating signal parameters as long as it has a loss tolerance $\epsilon$, once the optimization processor 35 has determined $\epsilon^*$, this value can be set in the compression processor 34, which could then be left alone to perform its normal compression operation without further intervention by the optimization processor. The optimization processor 35 could therefore alternatively be connected to the compression processor 34 via a separate off-line path (not between the compression processor 34 and decompression processor 36). The optimization processor 35 would then control the compression processor 34 only during an initial calibration stage until the knee point $\epsilon^*$ has been established and fixed in the compression processor 34. After that, the optimization processor can go off-line until a new knee point needs to be determined.

The parameters $D(S,\epsilon^*)$ may, for example, be the coordinates of the breakpoints of piecewise linear approximating functions (see FIG. 1), the coefficients of approximating polynomials, the frequencies, phases, and amplitudes of trigonometric approximations, or the identifiers associated with some other predetermined class of approximating functions.

The output from the decompression processor 36 is thus a signal that approximates the noisy input signal f with the error tolerance $\epsilon^*$, but it will in general be a greatly simplified or compressed signal compared to the noisy input signal. This means that the compressed representation g will require fewer resources to store and transmit. This may in turn provide the incidental advantage that one can use a transmission or storage rate higher than would have been possible if only the noisy input signal f were available.

Still referring to FIG. 1, notice that the compressed approximation $g_2(t)$ is much "smoother" than the noisy input signal $f(t)$. This is because the loss tolerance is small enough to track the desired noise-free signal $f_0(t)$ closely yet is not so small that it begins to track the noise $v(t)$. In other words, the decompressed approximating signal $g_2(t)$ tracks the noise-free signal $f_0(t)$, but the effects of the rapidly changing random noise are greatly decreased in the decompressed signal. Stated even more simply, using the compressed and then decompressed signal according to the invention, one obtains an output signal in which much of the noise has been filtered out. Filtering out of noise through data compression is a feature of this invention and does not depend on the use of piecewise linear approximating functions, although such approximating functions might be preferred in some applications.

In the example shown in FIG. 1, the loss tolerance $\epsilon$ is defined in terms of the maximum permissible difference between the filtered function g and the observed noise input signal f anywhere over the sampling range. Because the error "tunnel" is 2..$\epsilon$ wide, no point of the approximating function is more than $\epsilon$ away from the noisy input function anywhere over the sampling interval. This can also be expressed as follows:

$$\max\{|g(t_i)-f(t_i)|\} \leq \epsilon, \text{ for all } i$$

where $t_i$ is the ith sampling time of the function. (In FIG. 1, there are 26 sampling times).

The expression above essentially measures the distance between the functions g and f in terms of the well-known L-infinity ($L_\infty$) metric. Although this metric is very easy to calculate, it is not essential to the invention; any metric may be used. One example of a common metric that could be used instead is the well-known root-mean-square (RMS), according to which one takes the difference between the sampled input function $f(t)$ and the approximating function $g(t)$, takes the square of this value for every sampled point, then takes the average of the sum of all of the squares, and then takes the square root of this value. In other words, one generates approximations to the sampled input function and then minimizes the complexity of the approximating functions such that:

$$\sqrt{\sum_i [f(t_i) - g(t_i)]^2/N} \leq \epsilon, \text{ for all } i$$

Yet another metric that could be used would take the average of the sum of the absolute values of the difference between the two functions for all sample points as opposed to the average of the squares. The infinity metric is preferred in this invention, however, because it is theoretically easier to analyze and is computationally easier to implement.

Figure 4:
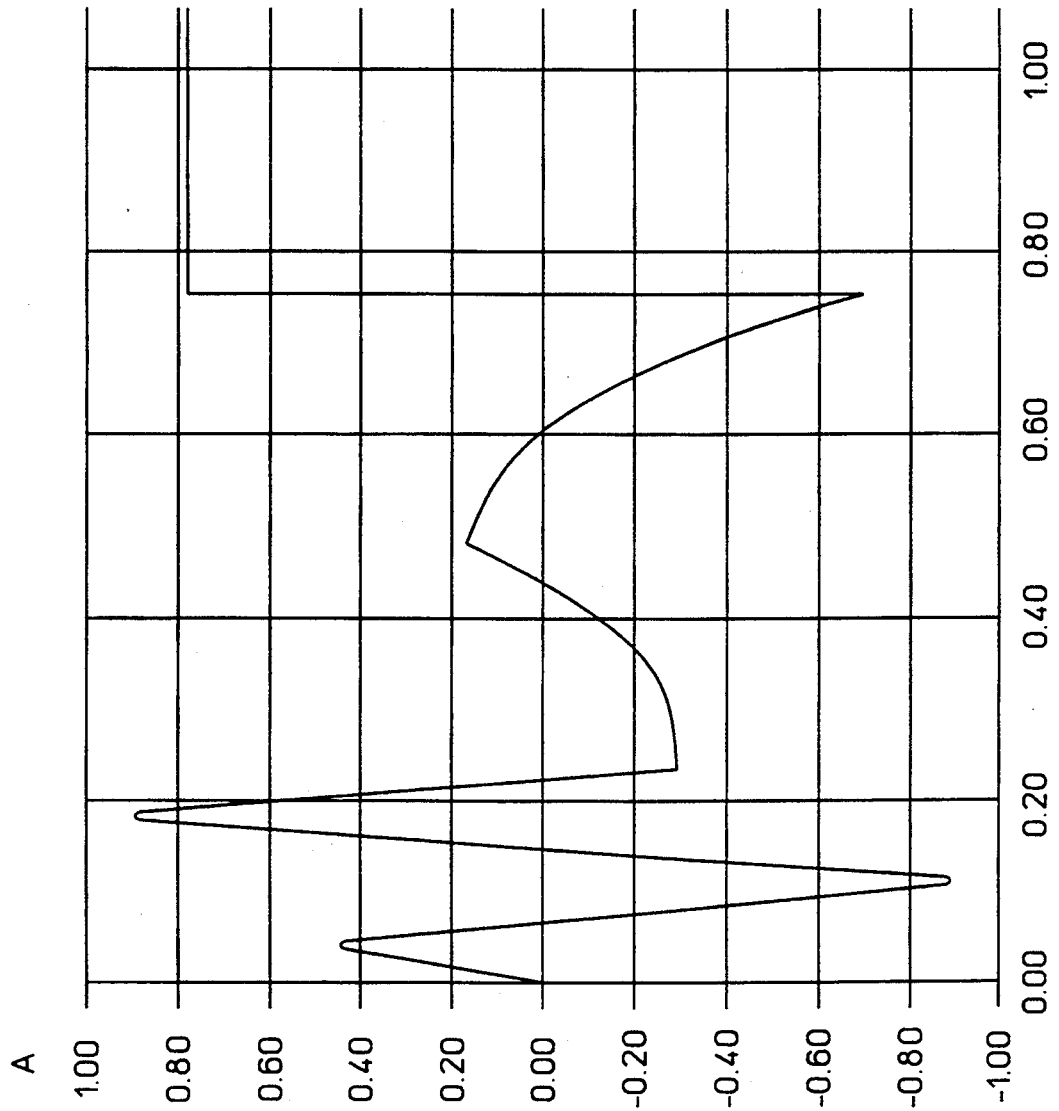
FIG. 4 is a plot of a noise-free signal used as a test function for the system according to the invention.

The system and method for filtering out random noise by compressing the input signal were tested using a simulated input signal having trigonometric, polynomial, exponential and linear pieces. The noise-free test input signal is illustrated in FIG. 4. As FIG. 4 shows, the test signal was defined over a time interval from 0.00 to 1.00. The test signal started out as a trigonometric function (with a combination of different frequencies and amplitudes), switched to a polynomial function at approximately t=0.25, switched to a exponentially decreasing function at time t=0.50, and then became linear (a step function) over the interval t=0.75 to t=1.00. The test function ranged in amplitude between approximately +0.95 and −0.95. The linear step function rose from approximately −0.7 to a constant value of 0.80.

Random noise $v$ that was uniformly distributed over the interval [−0.1, +0.1] was then added to the noise-free test signal to create a noisy test input signal, which was then sampled. Although uniformly distributed zero-mean noise $v$ was used in this experimental test for the sake of simplicity, as is illustrated below, the invention is also able to filter out noise that has a non-zero mean and is not uniformly distributed.

The compression routine used in this test of the invention generated piecewise linear approximations within a given error tolerance $\epsilon$; such a routine is illustrated in FIG. 1 and is described above. The measure of complexity C used in this test of the invention was the number of vertices in the piecewise linear approximating signal.

Figure 6:
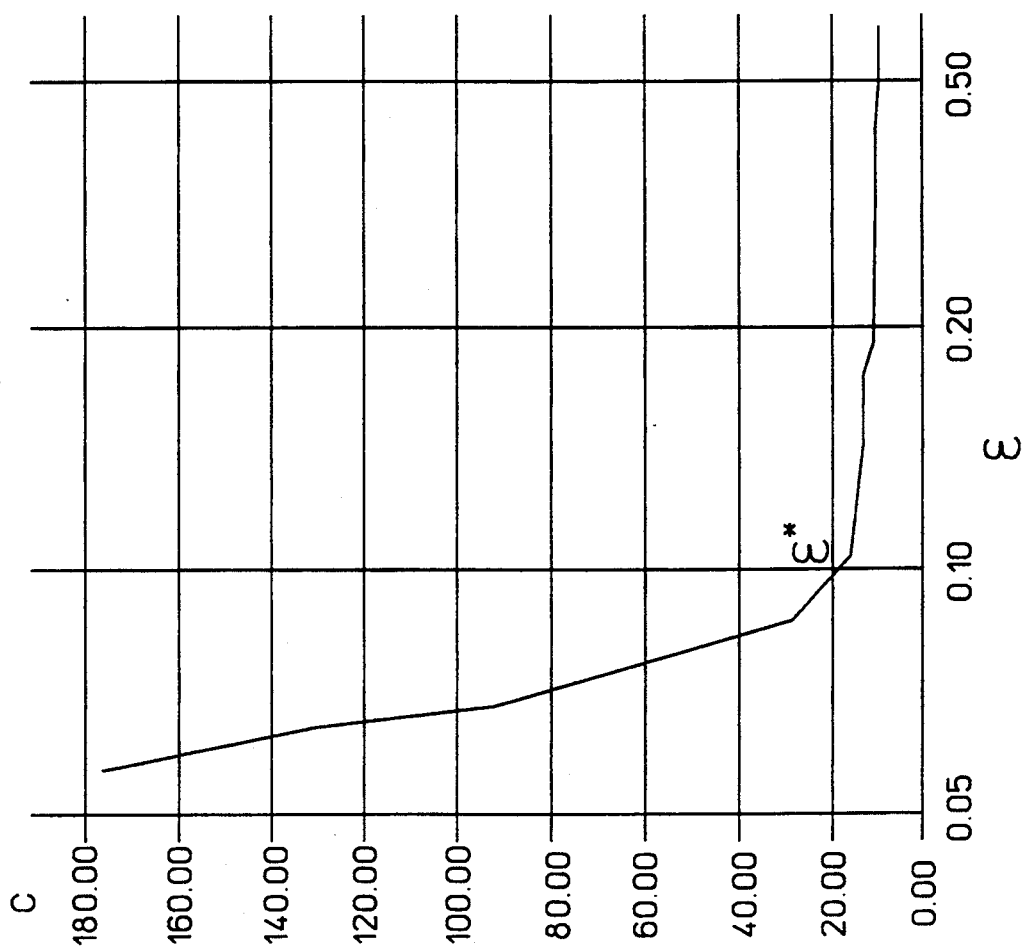
FIG. 6 is a plot of output complexity versus loss tolerance for the noisy test function of FIG. 5; this figure also illustrates the concept of an optimal knee-point value.

FIG. 6 is a plot of the complexity C and the loss tolerance $\epsilon$, and was obtained by running the compression routine for various values of $\epsilon$. As FIG. 6 indicates, the complexity of the filtered function began to rise rapidly once the loss tolerance $\epsilon$ was set less than about 0.1, which also was the strength b of the noise $v$. In other words, the knee point $\epsilon^*$ of the complexity/loss tolerance (C-$\epsilon$) curve was approximately at the value $\epsilon^*=b$, where b is the strength of the noise.

The inventor has discovered that this property holds for a large class of complexity measures and signals disturbed by random noise, and that compressing the noisy signal at an error tolerance equal to the knee-point $\epsilon^*$, and then decompressing to obtain the approximating signal, ensures that the approximating signal is an optimal filtering of the noisy signal. Inaccuracy in the determination of the knee point $\epsilon^*$ will add directly to the residual noise in the filtered output. Specifically, if the actual knee point is at $\epsilon^*=b$, and the observed knee point was at $\epsilon^*+\delta$, then the residual noise in the filtered output will be at least $\delta$.

FIG. 6 also brings out the analogy to Occam's Razor: using the method according to this invention, one assumes that the noise-free signal one is attempting to reconstruct is much less complicated than the noise that is disturbing it, and one selects an approximation (a filtered function) that is no more complicated than necessary, since any increased complication would merely mean that one is creating a filtered function that tracks the noise.

Figure 7:
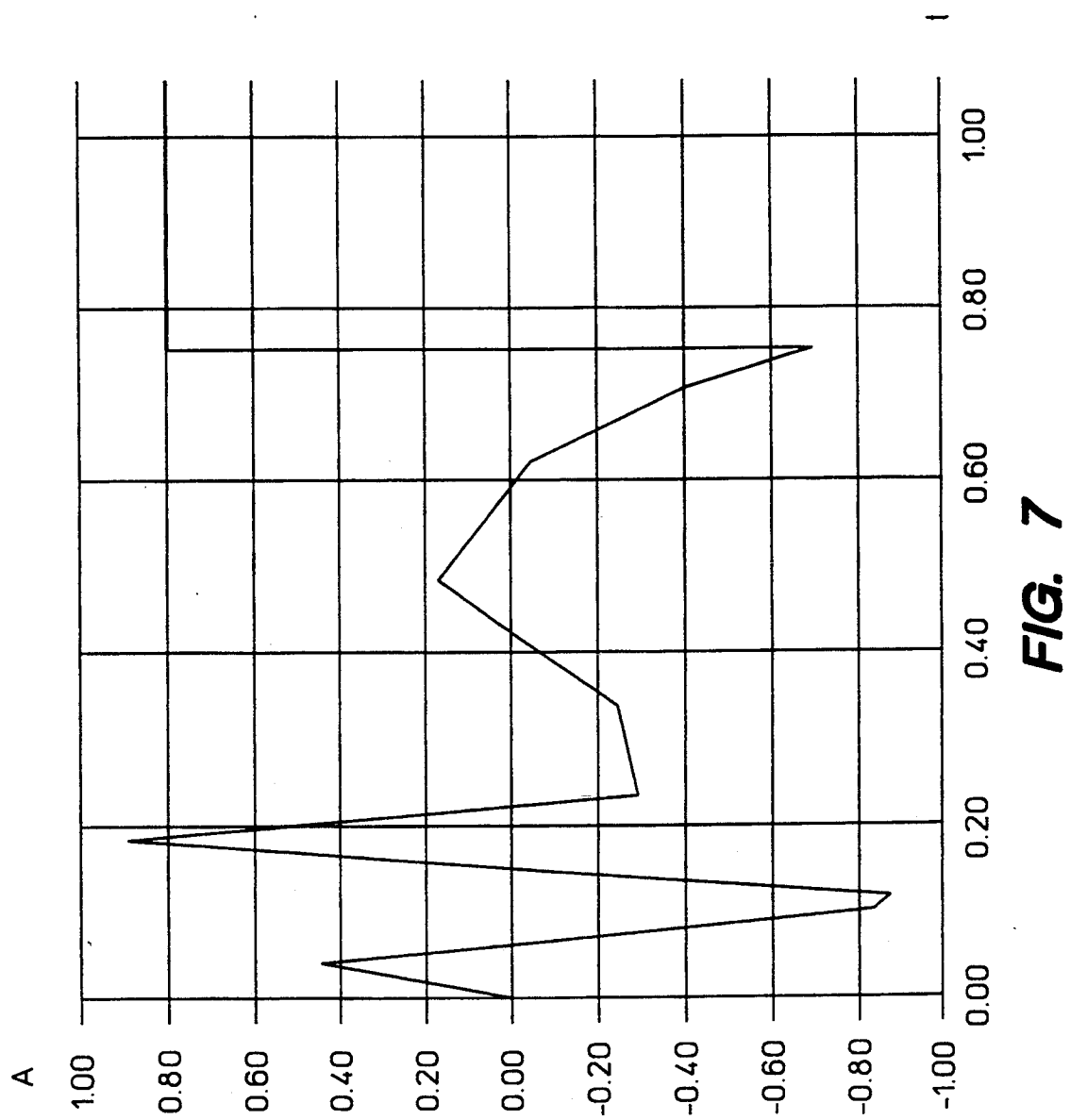
FIG. 7 is a plot of the output after filtering the noisy signal shown in FIG. 5, using the invention.

FIG. 7 is a plot that shows the filtered function g corresponding to the knee point $\epsilon^*$ in FIG. 6. FIG. 7 shows several advantages of the invention. First, comparing FIG. 7 with FIG. 5, one can see how effectively the system according to the invention filters out the random noise not only from the trigonometric piece of the input function, but also from the polynomial, exponential, and linear pieces. The efficacy of the invention can also be seen by comparing the filtered function in FIG. 7 with the actual noise-free function shown in FIG. 4.

Second, the filtered output of the invention is a piecewise linear function consisting of 20 vertices. In other words, the invention was able to compress 512 noisy samples into only 20 vertices. Considering that each vertex is two-dimensional, the invention was thus able to achieve a compression ratio of 512:40, which is better than 12:1. This compression is an advantage that is a byproduct of the invention.

In most practical applications of the invention, one will of course not know the strength of the noise that is disturbing the desired signal. As FIG. 6 shows, such knowledge is not necessary in order to calibrate the system according to the invention. Referring once again to FIG. 3, the device, such as an ECG monitor, would correspond either to the signal source 30 or to both the signal source 30 and the noise source 31. Using the invention, one then samples the output of the device while running it either in a real application or on a test pattern. Under the control of the optimization processor 35, the compression processor 34 then generates a sequence of filtered functions (in effect, constructing a C-$\epsilon$ curve such as in FIG. 2 or FIG. 6) and the optimization processor 35 then determines the knee point $\epsilon^*$.

If one can assume that the noise $v$ that disturbs the actual signals to be filtered by compression has approximately the same statistical properties (in particular, the same strength), as the noise present during calibration, then the optimization processor 35 can set the loss tolerance $\epsilon$ at a constant value of $\epsilon^*$ and the compression processor 34 can generate an optimal filtered functional approximation of the input signal using $\epsilon = \epsilon^*$ for each of a series of blocks of N samples of the input function f until there is a need to recalibrate the filter. This might, for example, occur if the signal source 30 is operated in an environment (such as a hot climate as opposed a previous cold climate or a place with significant electromagnetic interference) where one might expect the character of the noise $\epsilon$ to be different.

Referring to FIG. 2, given a constructed C-$\epsilon$ curve, three ways for the optimization processor to determine the knee point $\epsilon^*$ would be as follows:

1) The optimization processor could display a C-$\epsilon$ curve either on a screen or by actual plotting and then the user could select a point where the curve begins to rise sharply by visual inspection. A suitable conventional input device to the optimization processor would then preferably be included;
2) The concept of a "sharp" rise can be quantified as the point on the C-$\epsilon$ curve at which its second derivative attains a maximum. Using known numerical techniques, the optimization processor 35 can determine this point, which will be $\epsilon^*$.
3) Since the C-$\epsilon$ curve rises sharply at the knee point $\epsilon^*$ (the slope changes abruptly) but is relatively "flat" on either side of $\epsilon^*$, the optimization processor 35 can use known techniques to approximate the C-$\epsilon$ curve as two straight lines (a "bilinear approximation"). The $\epsilon$ value of the point at which the lines meet is then taken as $\epsilon$;

Yet another way to determine the knee point $\epsilon^*$ using a family of C-$\epsilon$ curves is described below, and other still other methods are also possible. Common to these methods, however, is that they determine the point at which the second derivative of the C-$\epsilon$ curve is at a maximum (where the "slope" of the curve changes the fastest), that is, the point of maximum acceleration of the complexity viewed as a function of loss tolerance.

It is not necessary to recalibrate the filtering system for different signal sources, as long as the noise source is unchanged, since the knee point $\epsilon^*$ depends only on the noise source. In this sense, the filtering system is self-calibrating in that it exploits the inventor's discovery that the knee-point $\epsilon^*$ is at the noise strength b in all cases sharing the same noise source.

Assume now that one wished to filter the signals from an ECG monitor that is hooked up to a patient. The output signal from the ECG sensor is then sampled in the S/H circuit 32 and the sampled values are stored in blocks in the memory unit 33. Depending on the amount of storage space one chooses for the memory unit 33 and the speed of the various processors used in the system, the system could store one, two, or more blocks of samples as long as an optimal (knee point) filtered, compressed signal can be generated within the time it takes to read in the next block of samples.

If each block of samples has approximately the same noise characteristics, once the optimization processor has calculated $\epsilon^*$, it can allow the compression processor to operate freely with $\epsilon$ set to $\epsilon^*$. For each block of samples, the compression processor 34 can then determine the output parameters $D(S,\epsilon^*)$ of the filtered signal g. These parameters can then be stored in much less space than it would take to store all of the samples, and the signal form that they correspond to represents a signal that approximates the noisy input signal f within the given loss tolerance $\epsilon^*$ but with most of the noise filtered out. The signal filtered by compression according to this invention is therefore more easily represented, which makes it easier to store for future use, faster to transmit, and much more efficient to use as the parameters of a plotting or display device, especially those that plot using a vector format.

Providing there is enough space in the memory unit 33, one could also store an entire representation of the noisy input signal f, for example, all of the values scanned by a fax machine or all of the amplitude or spectral values of a time block of digitized speech. The optimization processor 35 can then determine the knee point $\epsilon^*$ for the entire series of values at once; the number of samples that can be filtered together will in general depend on the amount of time lag one is willing to accept between the initial creation of the noisy input signal f and the generation of the approximating, filtered equivalent g. As is mentioned above, however, in certain applications, there will be no need for a memory unit 33, which can then be omitted.

Of course, since no practical filter is ideal, there will always be at least a slight difference between the filtered signal g and the noise-free input signal $f_0$. The error that remains after filtering is known as "residual noise."

Figure 8:
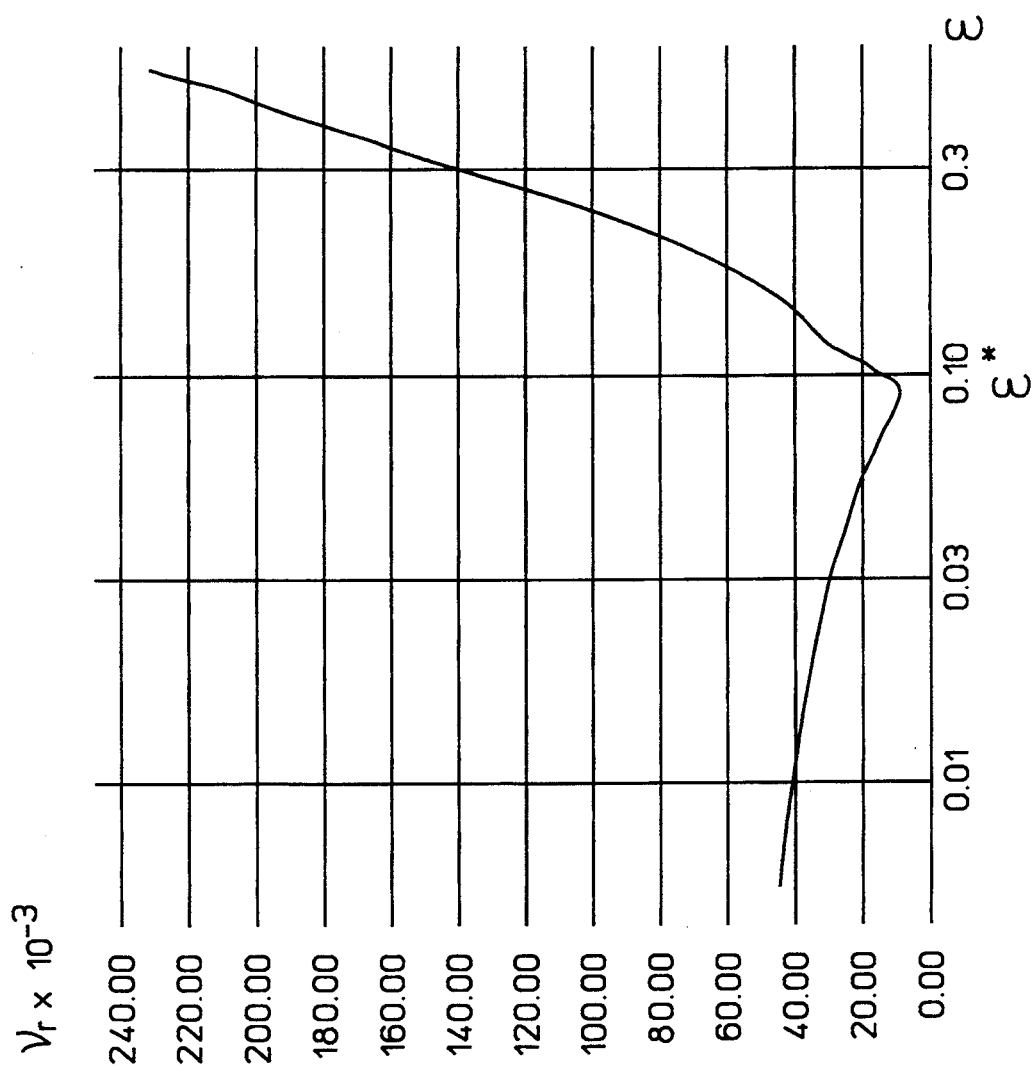
FIG. 8 is a plot of residual noise in the filtered signal as a function of loss tolerance.

For the example shown in FIGS. 4–7, FIG. 8 is a plot of the residual noise $v_r$ as a function of loss tolerance $\epsilon$. FIG. 8 was generated in the following manner: for each value of the loss tolerance $\epsilon$, the compression routine determined the piecewise linear function $h_\epsilon$ that had the fewest breakpoints and that was within $\epsilon$ of the sampled noisy input values. The residual noise was then computed as the average error between $h_\epsilon$ and $f_0$, that is:

$$v_r(\epsilon) = \int_0^1 |h_\epsilon(t) - f(t)| dt$$

In FIG. 8, notice that the minimum value of the residual noise $v_r$ is approximately 0.01, as compared with the average absolute value of the noise $v$, which is 0.05. In other words, by selecting a filtered signal at the knee point $\epsilon^*$, the invention was able to reduce the amount of noise (the error between the noise-free signal $f_0$ and the filtered signal g), roughly by a factor of 5.

As FIG. 8 shows, as the loss tolerance $\epsilon$ decreases from a large value, for example, $\epsilon = 0.3$, toward the knee point $\epsilon^*$, the amount of residual noise also decreases. The inventor has discovered, however, that the amount of residual noise $v_r$ reaches a minimum at about $\epsilon^*$ and then, as the loss tolerance decreases, actually begins to rise once again. This is because the compression routine (the construction of a piecewise linear approximating signal) begins to track the noise $v(t)$ itself once the loss tolerance drops below the strength b of the noise. Once again, experimental results confirm the advantages of the invention, which selects a loss tolerance $\epsilon$ preferably at the knee point $\epsilon^*$, which is at or near the strength b of random noise $v$.

Figure 9:
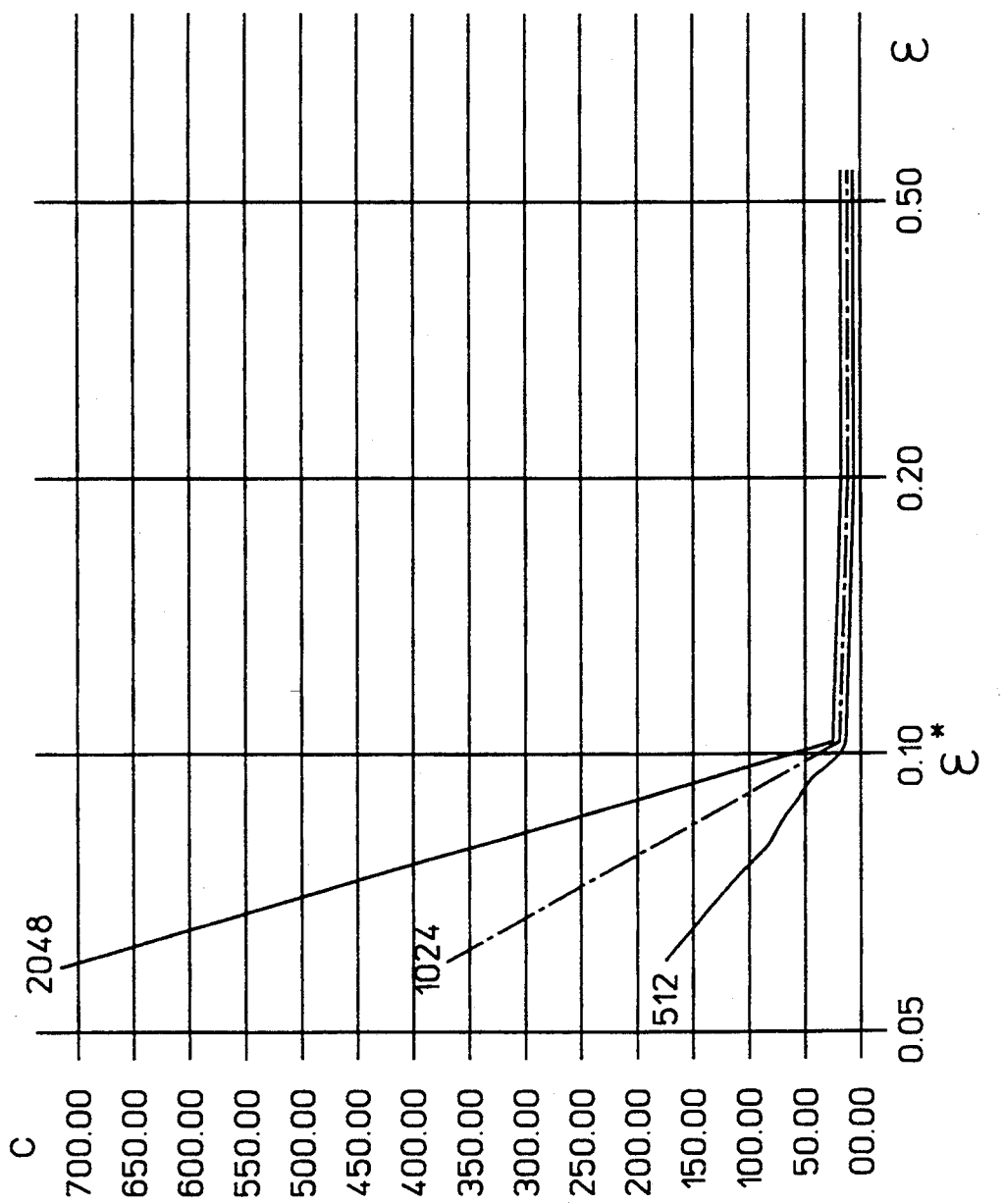
FIG. 9 is a plot of output size or complexity as a function of loss tolerance for different rates of sampling of the noisy input signal.
Figure 10:
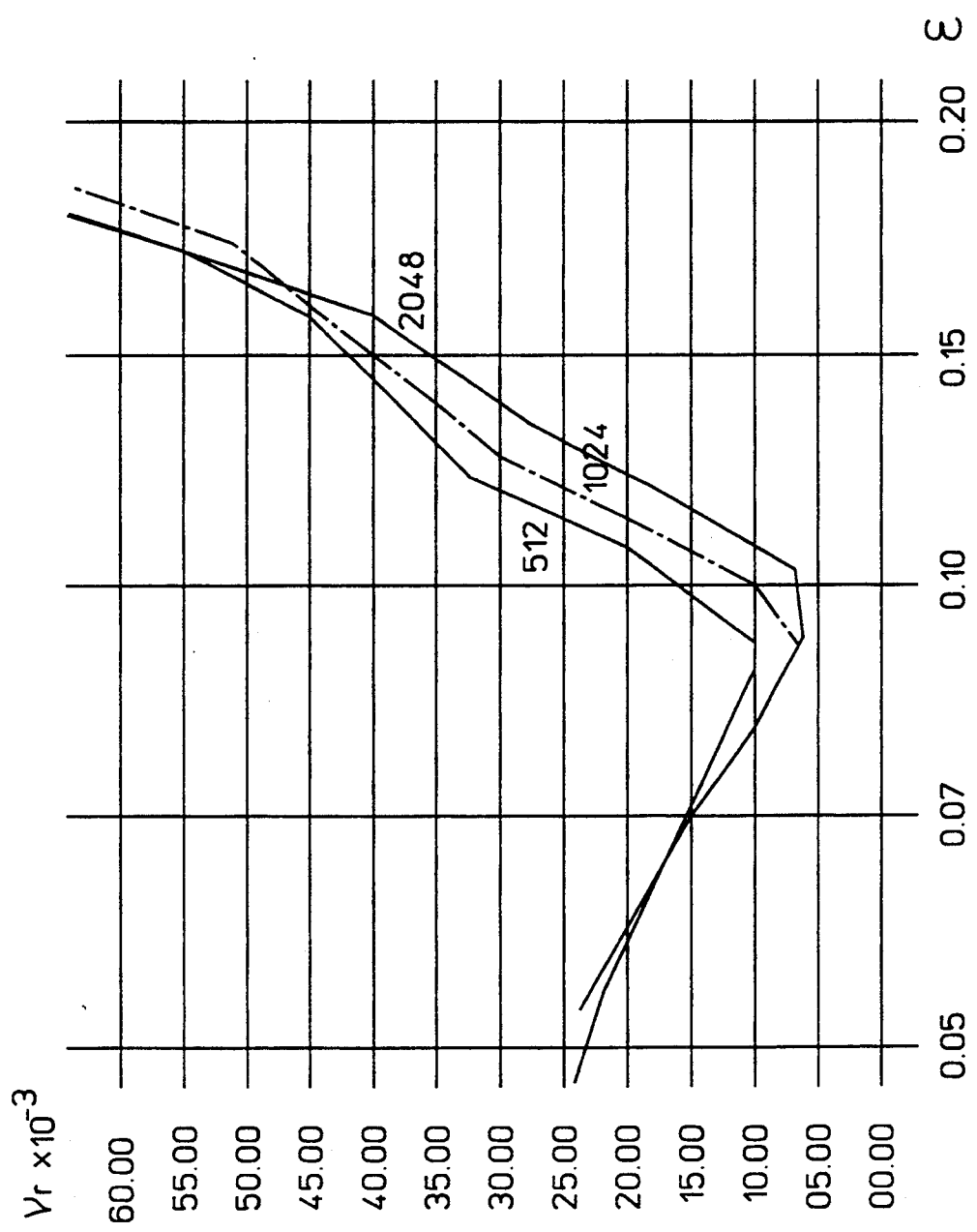
FIG. 10 is a plot of residual noise versus loss tolerance for different rates of sampling of the noisy input signal.

To demonstrate yet another feature of the invention, FIG. 9 shows a plot of the complexity measured in the number of required vertices in the piecewise linear filtered signal as a function of the selected loss tolerance $\epsilon$ for different sampling rates N=512, 1024, and 2048. As before, uniformly distributed random noise $v$ in [−0.1, +0.1] was added to the composite function $f_0$ shown in FIG. 4. FIG. 10 is a plot of the residual noise as function of loss tolerance for the different sampling rates.

FIG. 9 shows that, for a given loss tolerance $\epsilon < \epsilon^*$, the complexity C of the output signal increases with increasing sampling rate N. On the other hand, as FIG. 10 shows, the minimum residual noise decreases with increased sampling rate N.

Of particular interest in FIG. 9, however, is that for values of $\epsilon > \epsilon^*$, the degree of complexity is roughly the same for all sampling rates for about N=512 and higher. In other words, the complexity curves diverge starting at about the knee point $\epsilon^*$. FIG. 9 thus illustrates yet another way to determine the knee point $\epsilon^*$ for a given noisy input signal: referring once again to FIG. 3, the optimization processor 35 can set the sampling rate N for the sample-and-hold circuit 32 at its highest practical rate, and it can then vary the loss tolerance parameter $\epsilon$ applied to the compression processor 34 as before to build up a C-$\epsilon$ "curve" for the given sampling rate. The optimization processor 35 can then either decrease the sampling rate N and rerun the sampling on the same noisy input signal, or it can simply direct the compression processor 34 to generate approximating functions based on every other sampled value (dividing the sampling rate by 2), every third sample value (effectively cutting the sampling rate a factor of 3), every fourth sampled value, and so on, or take some random sample of the sampled values themselves.

For each actual or effective change of sampling rate, the optimization processor 35 varies the loss tolerance e applied to the compression processor 34 in order to construct a parametrization of the C-$\epsilon$ relationship for different sampling rates N. The optimization processor 35 can then select as the knee point $\epsilon^*$ the value of loss tolerance $\epsilon$ for which the parametrized curves begin to diverge. The point of divergence may be when they differ by more than a predetermined amount, for example, by more than 5%, by more than 1%, or by some other user-defined threshold amount depending upon the application and upon the degree of one's knowledge of the characteristics of the noise-free input signal and of the noise $v$.

For any given maximum allowable time lag between receipt of a noisy input signal f and the generation of a filtered output signal g, there will be some maximum sampling rate that the chosen sampling, memory, and processing components of the filtering system will be able to achieve. Comparing FIGS. 9 and 10, one can see that it is therefore advantageous to select the highest possible sampling rate as the basis of the values used by the compression processor 34 since this will minimize the residual noise $v_r$ while not increasing the complexity of the output significantly, provided of course that the loss tolerance $\epsilon$ is chosen at the knee point $\epsilon^*$. Of course, if one is willing to tolerate somewhat greater residual noise, then one may use a lower sampling rate for values of $\epsilon$ at or just below $\epsilon^*$.

Yet another way to determine the knee point $\epsilon^*$ requires some knowledge of the distribution or at least strength of the random noise $v$. As is mentioned above, the inventor has discovered that the knee point $\epsilon^*$, which provides an optimal trade-off between complexity and loss tolerance for many applications, is at or near the strength b of the random noise. Using known techniques, one could calibrate a given signal source such as a video camera or ECG monitor by analyzing its output when it is operating based on some known reference signal. The statistical properties of the noise can then be determined using known techniques.

Although such signal analysis would be easy enough to do in a laboratory setting, in general one will not know the strength b of the random noise that disturbs the noise-free signal $f_0$ of an instrument in the field. Furthermore, certain applications may have non-repeatable signals so that the ability of the filtering system to calibrate itself would often be preferable.

Figure 5:
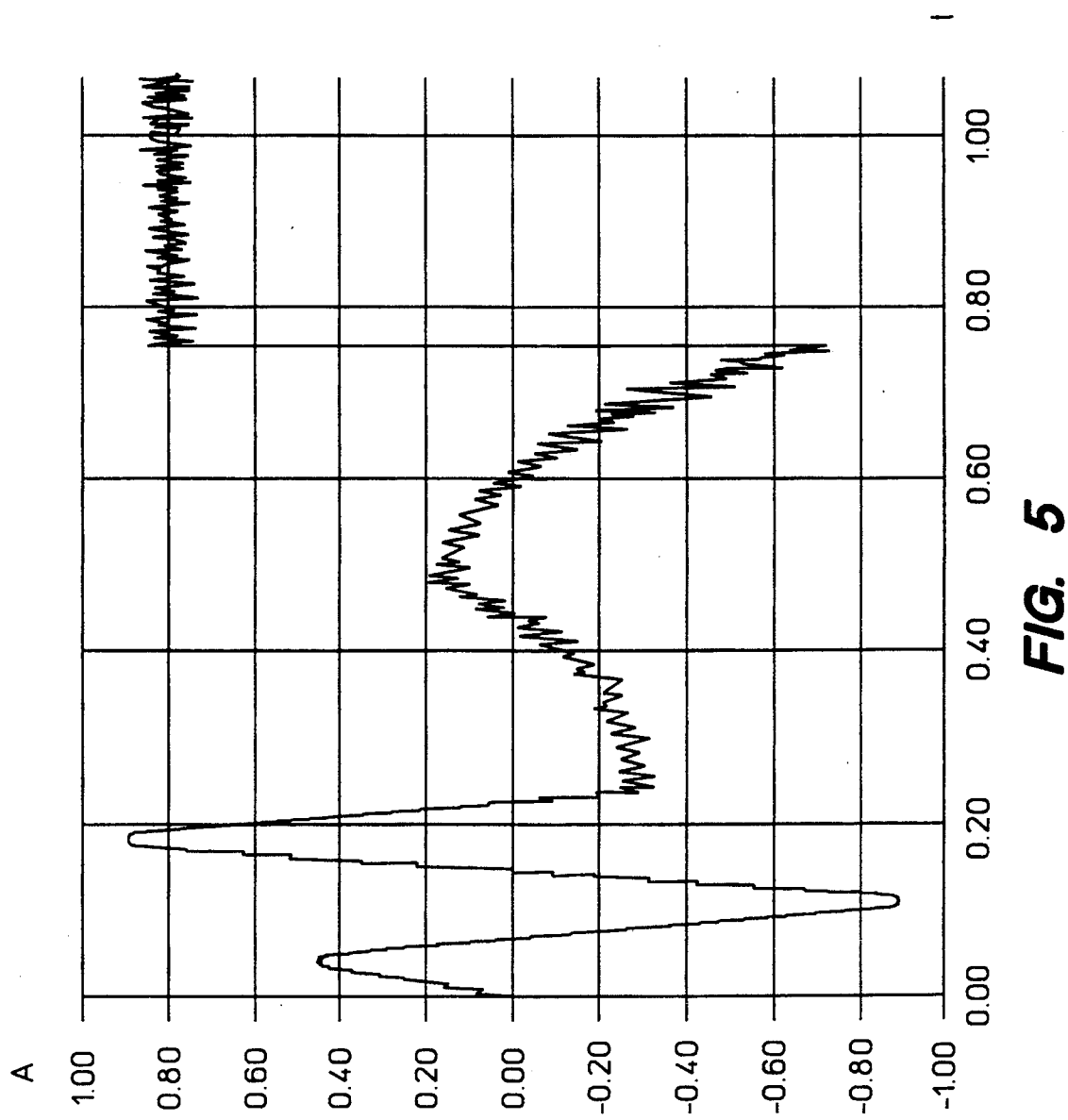
FIG. 5 is a plot of samples of the test function of FIG. 4 with random noise added.
Figure 11:
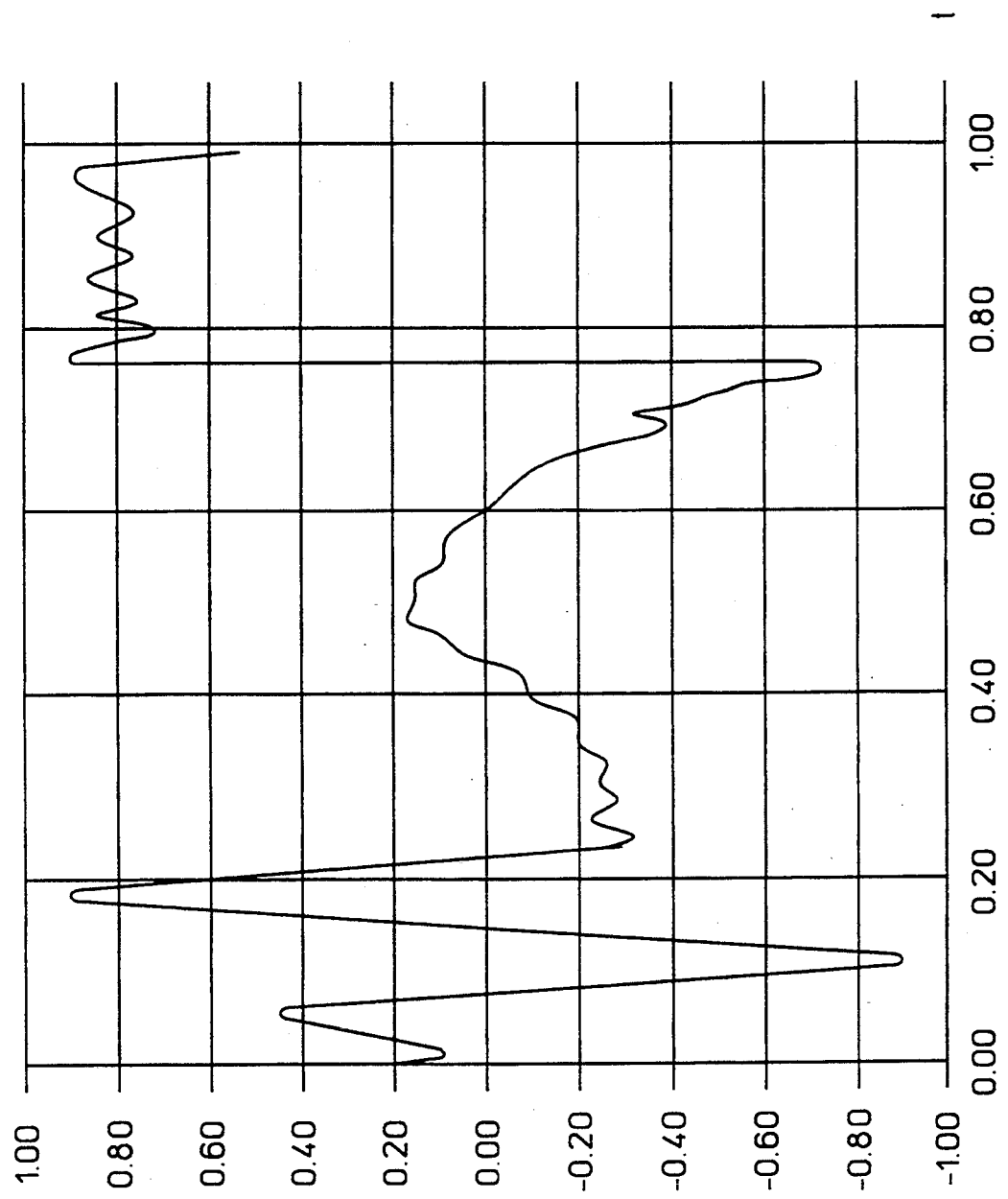
FIG. 11 is a plot of the output from a spectral low-pass filter according to the prior art run on the sampled noisy signal of FIG. 5.

FIG. 11 shows the result of filtering the sampled noisy input signal of FIG. 5 with a commonly used spectral low-pass filter. The band-width of the spectral filter was chosen to give the best visual agreement with the noise-free function $f_0$. As is to be expected, the low-pass filter did well in the trigonometric portions of the test signal, since it is based on theories (such as the Fourier analysis), that decompose signals into trigonometric components. On the other hand, this prior art filter did poorly at the discontinuities of the test signal and had difficulty settling down over the constant portion of the step function (in the interval $0.75 \leq t \leq 1.0$). By comparing FIGS. 11 and 7, one can easily see the superior performance of the filtering system according to the invention, especially at discontinuities and over non-trigonometric portions of the input signal.

Figure 12:
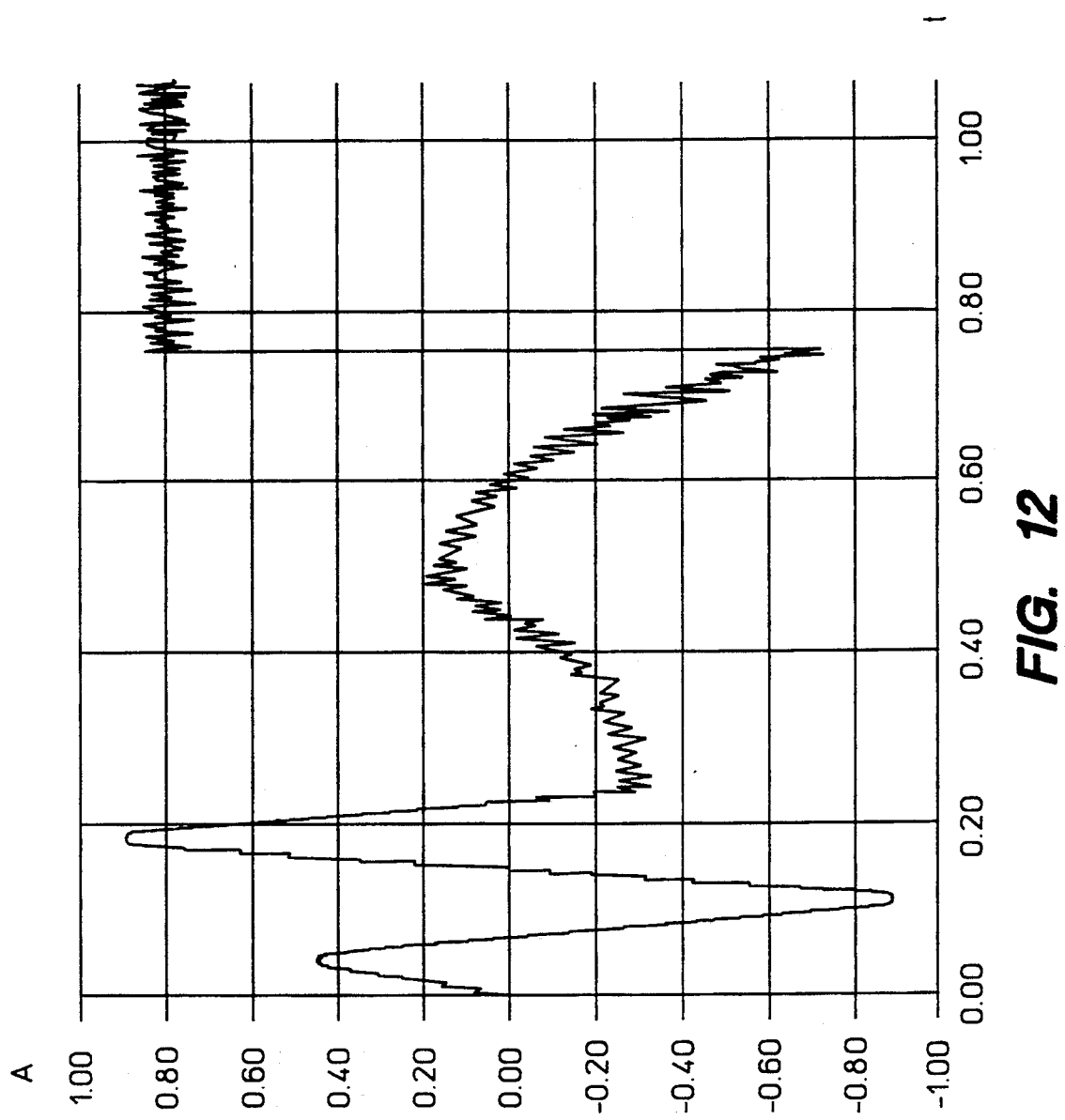
FIG. 12 is a plot of samples of the test signal of FIG. 4 with random noise added, in which the random noise has a non-zero mean.

As was mentioned above, the superior filtering performance of the invention does not depend on the noise $v$ having a zero-mean. FIG. 12 shows 512 samples of the same noise-free signal as in FIG. 4, but in this case, the signal is disturbed by additive noise that is equal to 0.05 with a probability of one-half and is uniformly random in the interval $[-0.1, +0.1]$ with probability one-half. Hence, the mean of the noise is 0.025 and is non-zero. Furthermore, the overall distribution of the noise is not uniform over $[-1.0, +1.0]$.

Figure 13:
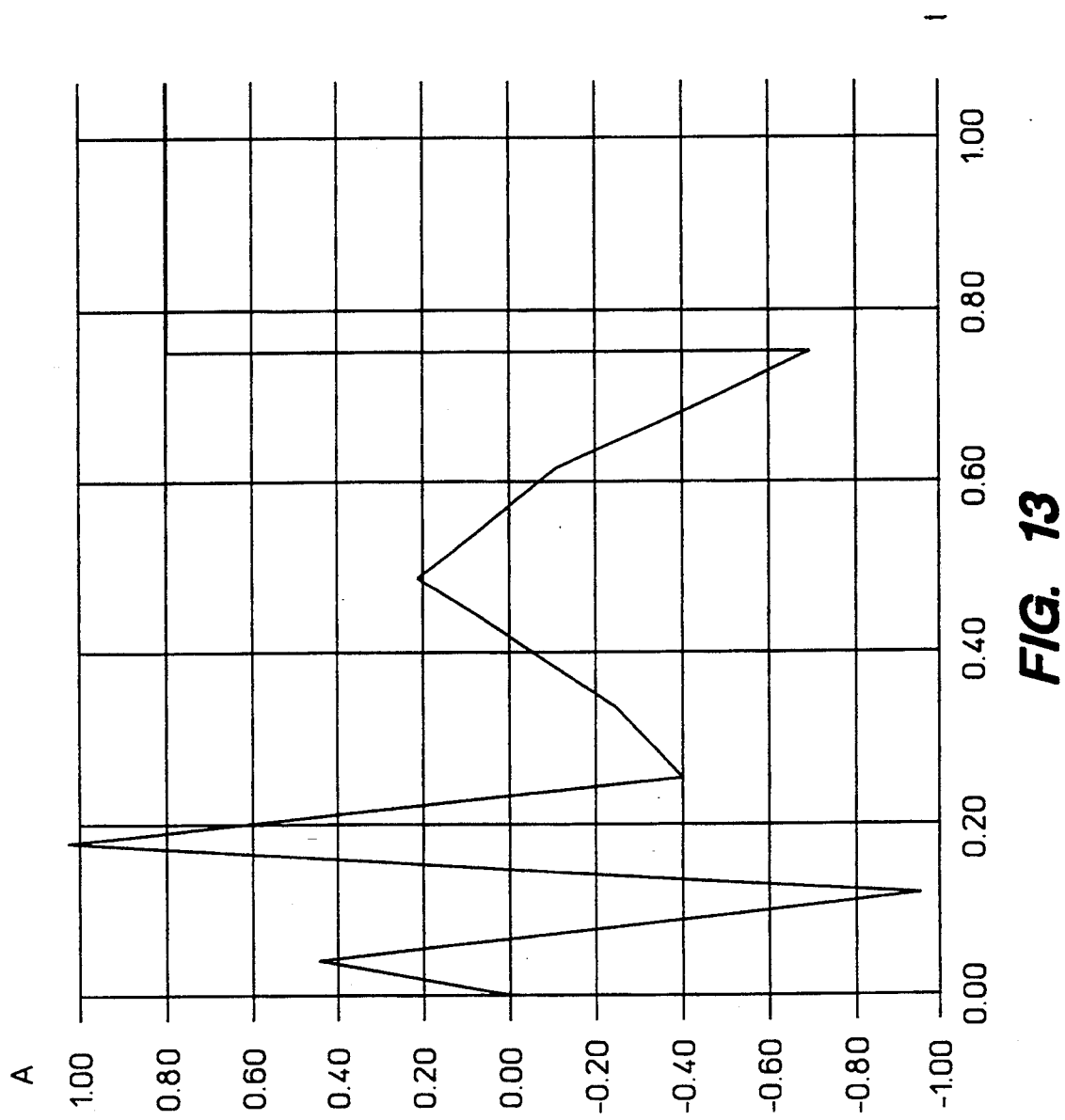
FIG. 13 is a plot of the output from the filtering system according to the invention with the sampled noisy signal shown in FIG. 12 as the input.

FIG. 13 shows the filtered signal that is generated using the filtering system according to the invention for the signal shown in FIG. 12. As before (see FIG. 7), the filtered function closely approximates the actual noise-free signal and it does so using only about 20 vertices. Notice in particular, moreover, that the invention filters out the non-zero mean of the noise as well.

The inventor has discovered that, for all types of noise, rather than the noise and the loss tolerance adding in their contribution to the residual error as one might expect, the noise and the compression loss cancel each other out, and the extent of the cancellation depends on the sampling rate. In short, as FIG. 10 illustrates, the higher the sampling rate, the greater the cancellation and hence the lower the residual noise. In particular, this characteristic of the method according to the invention also applies to non-uniform or non-zero mean noise as that shown in FIG. 12.

Figure 14:
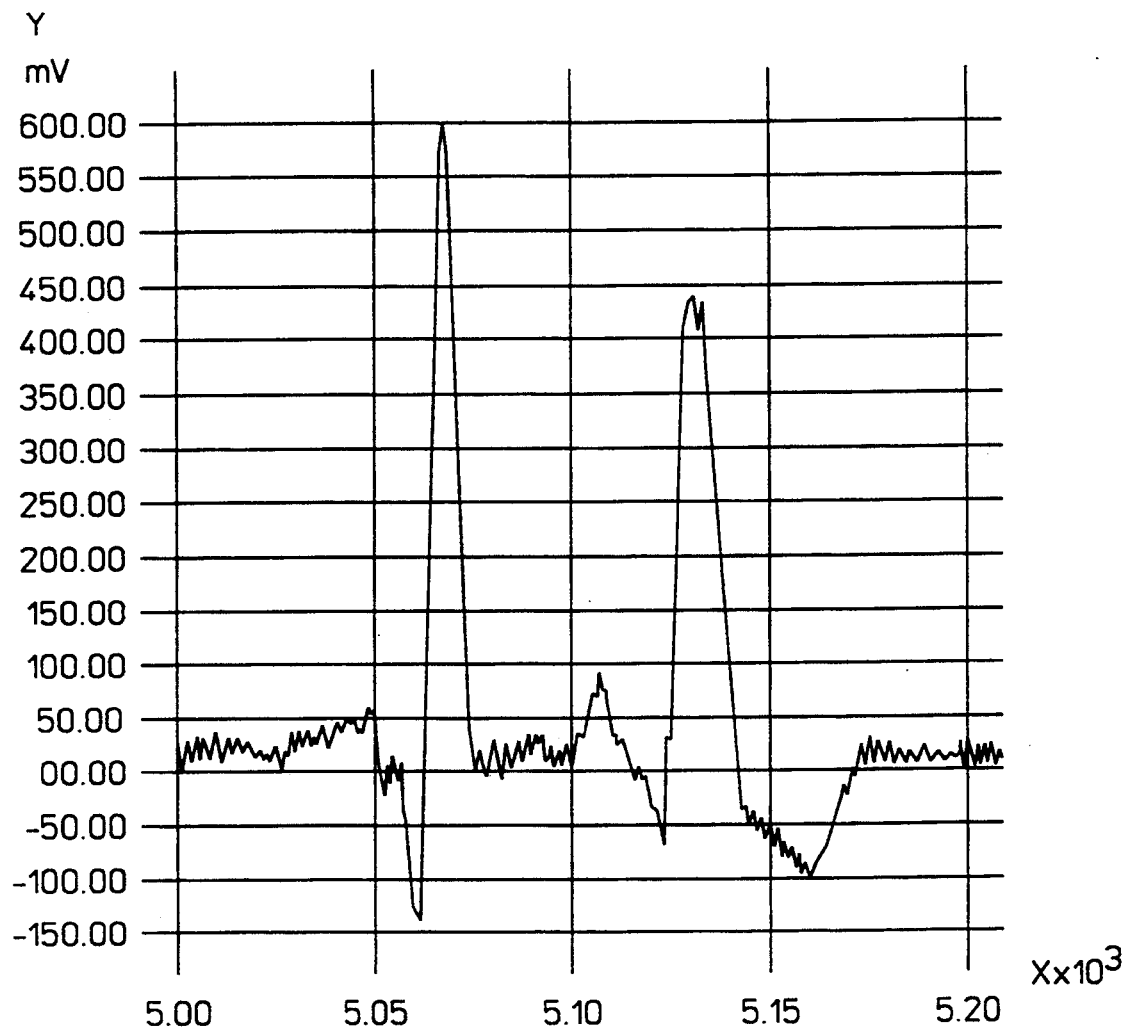
FIG. 14 is a part of an actual electrocardiogram (ECG) signal used to test the filtering system according to the invention.

The invention was also tested on actual data from an electrocardiogram (ECG) monitor; the electrocardiac activity of an actual human subject was used. FIG. 14 is a section of a plot of the ECG. FIG. 14 thus shows the noisy input signal, plotted in units of millivolts, to the filtering system according to this invention. To generate FIG. 14, an actual ECG signal was sampled at a rate of 120 samples per second and each sample point was numbered. FIG. 14 (and FIG. 16 below) shows the plot for 200 sample values, from sample number 5000 through sample number 5200, which represents a 1.667 s portion of the input signal.

The compression routine used in this test of the invention was one that generated piecewise linear functions within given error or loss tolerances $\epsilon$. The metric used to determine the amount of error (the loss tolerance) was, as above, the $L_\infty$ metric. The measure of complexity applied was, as before, the number of vertices needed to approximate the signal within a given error tolerance $\epsilon$.

Figure 15:
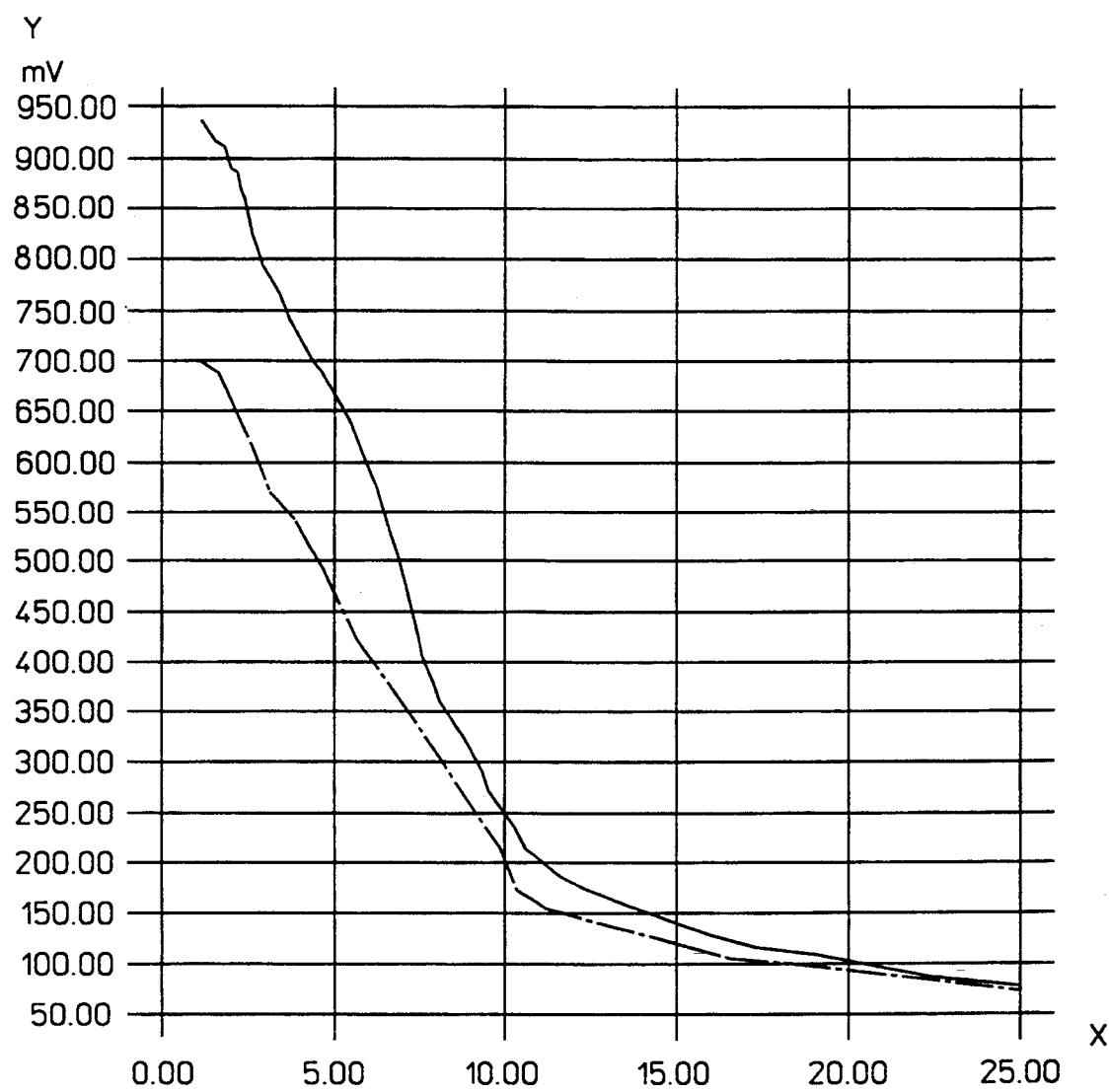
FIG. 15 is a plot of output complexity as a function of loss tolerance generated by the invention when run on the ECG signal of FIG. 14.

FIG. 15 shows the C-$\epsilon$ tolerance curves for the different sampling rates of the ECG signal. The upper curve shows the results computed based on 1000 samples. The lower curve shows the results based on 766 samples, which were selected at random from among the 1000 already available samples, effectively cutting the sampling rate by about a fourth. (This shows the way in which the optimization processor can "simulate" different sampling rates.) A knee point of $\epsilon^* = 10.00$ was selected as being roughly the loss tolerance at which two straight-line approximations of the upper, higher-rate C-$\epsilon$ intersected.

Figure 16:
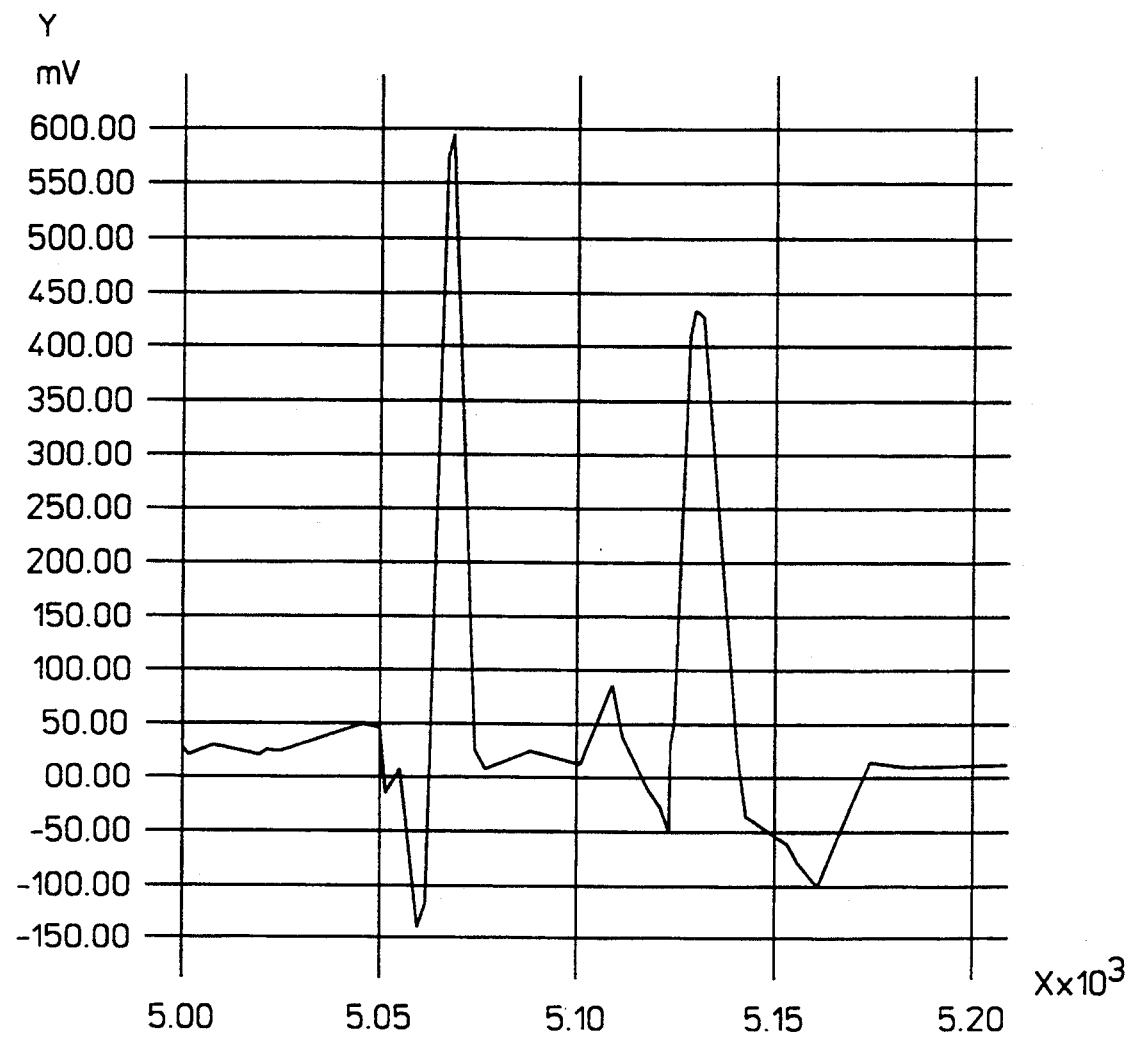
FIG. 16 is a plot of the filtered output signal from the invention with the ECG signal of FIG. 14 as the input.

FIG. 16 is a plot of the filtered signal obtained using the knee point value $\epsilon^*$ and the piecewise linear signal reconstruction method at the chosen knee point value $\epsilon^* = 10.00$. As in the earlier test case (see FIGS. 4–7), the system according to the invention effectively filtered out the random noise that distorted the underlying ECG signal. As will be the case in most practical applications of the invention, note that the system did not have forehand knowledge concerning the strength of the random noise; rather, the system gains an accurate estimation of the noise strength since, as the inventor has discovered theoretically and confirmed experimentally, the noise strength b will be approximately equal to the knee point value $\epsilon^*$ of the loss tolerance.

In yet another test of the invention, two-dimensional video data from a standard video camera was compressed into a series of one-dimensional values (a bit stream) using the well-known lossless Lempel-Ziv (L-Z) scheme. For each pair of two-dimensional frames of video data, a differential or "motion estimation" frame was constructed in a known manner by performing a simple matrix subtraction. This differential frame or matrix was then compressed using the L-Z scheme, but the parameters of the compression were varied by the optimization processor as is described below.

Referring to FIG. 3, in this test application, "sampled" values of the input signal were "automatically" made available to the filtering system according to the invention in that the filtering system was presented with a matrix of discrete values corresponding to already sampled and transformed video data points. As such, the signal source 30, the noise source 31, and the S/H circuit 32 were all embodied in the video camera and conventional transformation circuitry itself. Each value in the matrix was, as is conventional, represented as an 8-bit data word, so that all values could be represented as an integer within the range [0,255].

In this application, the compression processor 34 used as its variable loss tolerance a threshold such that any value in the differential frame matrix below the threshold was simply set equal to zero. For example, for $\epsilon = 32$, any value in the differential frame less than 32 was simply zeroed out; all values greater than or equal to 32 were then left as is.

For each chosen threshold value (the loss tolerance $\epsilon$), the values of the differential frame (which were stored in a memory unit such as the memory 33) below the threshold were zeroed out, and lossless L-Z compression was then performed on the resulting frame. The measure of complexity used was the number of data bits needed to store the output of the L-Z compression routine for each threshold $\epsilon$.

Observe first that for any $\epsilon > 255$, the complexity would be essentially zero, since all values would be zeroed out. On the other hand, for very small values of $\epsilon$, for example 2, almost all elements of the motion estimate "matrix" would remain, since only the few elements at the far low end of the representation range would fall below the loss tolerance threshold.

The C-$\epsilon$ curve generated by the invention when filtering the video signals using repeated L-Z compression also displayed a knee point value $\epsilon^*$, below which the complexity of the output (the size of the bit stream necessary to represent the L-Z compression) rose rapidly. In fact, the inventor discovered that using Huffman coding (another well-known lossless bit stream compression scheme), instead of the L-Z scheme, also yielded roughly the same knee point $\epsilon^*$. In the actual case, the system selected a knee point value of $\epsilon^* = 8$. In other words, all values in the differential frame matrix that fell below the value 8 were set equal to zero.

In this setting, prior art spectral filters typically take a spectral transform of the video frame, such as the well-known Discrete Fourier Transform or the Discrete Cosine Transform, and then zero out the high frequency terms in the transform matrix, under the assumption that the noise resides primarily in these terms. Inverting the transform then yields the filtered video image, with the undesirable side effect that sharp features in the image are dulled. This dulling of sharp effects can be seen in the one-dimensional case shown in of FIG. 11. In contrast, the system according to the invention did not need to make assumptions about the frequency distribution of the noise, and does not dull sharp features in the image.

The video source incorporated in the filtering system according to the invention was first a section of a commercial network television broadcast, and then a "home video" showing the jacket of the laser disc of the movie "Top Gun" as the jacket was moved around the laboratory. The L-Z compression scheme was allowed to proceed to run on successive differential frames with values less than eight ($\epsilon^*$) zeroed out. The thus filtered signal was then passed on in the conventional manner to the decompression processor 36, which reconstructed a two-dimensional video signal in a known manner from the series of L-Z compressed representations.

In all cases, the video picture was visibly improved: much of the speckling (noise) was eliminated. As a side benefit of the filtering by the invention, the amount of information to be transmitted (the filtered signal), was less random and could thus be compressed more efficiently for transmission using known techniques such as the L-Z scheme. (Note that encoding and compression for the purposes of transmission is not the same thing as the compression to determine a knee point value $\epsilon^*$ used during the filtering stages in the invention.)

In yet another application of the method and system according to the invention, the invention can actually be used to design conventional spectral filters. In such an application, the user selects the complexity C of a signal with respect to a specified tolerance $\epsilon$ to be the minimum number of frequencies required to approximate the signal as a Fourier series, within the specified tolerance. In this case, the root-mean-square (RMS) metric would be used.

Referring to FIG. 3, the compression processor 34 would first compute the discrete Fourier transform of a block of samples. Then, in order of increasing magnitude, the compression processor 34 would zero out successive terms of the transform as long as the RMS value of discarded terms does not exceed $\epsilon$. The remaining terms would form the compressed representation of the signal, and the number of such terms would be the complexity of the signal with respect to tolerance $\epsilon$. Notice that the compression processor follows the maxim of William of Occam in that it looks for the smallest number of frequencies that will adequately represent the signal.

The inventor has discovered that even for such an application as this, the complexity rises sharply when the loss tolerance $\epsilon$ is set below the noise strength. This agrees with the general observation that more frequency components are needed to represent most random noise than are needed to represent most signals. Using the methods described above, the optimization processor 35 would vary the loss tolerance $\epsilon$ applied to the compression processor 34 and would construct a representation of a complexity-loss tolerance (C-$\epsilon$) curve based on the compressed signals (the set of included frequencies) generated by the compression processor 34.

Once the optimization processor 35 has established a value of $\epsilon^*$, the compression processor 34 can be run without further supervision from the optimization processor 35. The compression processor 34 could then be thought of as a conventional spectral filter, with the frequencies that it sets to zero being its stop-bands, and the frequencies that it retains being its pass-bands. Indeed, one could then replace the compression processor 34 with a physical filter with exactly the same stop and pass characteristics.

In general, the stop-bands and pass-bands as described above can be fairly complicated and difficult to discover manually. The invention can thus be applied with advantage to automate the design of conventional spectral filters.

Several applications of the invention are described above. Common to all are the following properties: 1) the noise is random, while the noise-free signal is not; 2) one imposes a metric on signals to measure the difference between two signals; and 3) one places a complexity measure on signals. The invention is equally applicable to all such systems, demonstrably so in the particular applications described above.

I claim:

1. A system for filtering a noisy signal, which includes a desired signal corrupted by random noise, comprising:
   A. a source of discrete samples of the noisy signal;
   B. a compression processor having, as an uncompressed input, the discrete samples of the noisy signal, and having as a compressed output a compressed representation of an approximation signal that differs from the uncompressed input by no more than an adjustable error tolerance, which is a predetermined function of a predetermined error metric and is smaller than the uncompressed input in a predetermined complexity measure;
   C. a decompression processor having the compressed representation of the approximation signal as a compressed input and having the approximation signal as a decompressed output; and
   D. an optimization processor that has:
      1. an optimization input connected to the compressed output of the compression processor to receive the compressed representation of the approximation signal; and
      2. a tolerance output connected to the compression processor and conveying the adjustable error tolerance of the compression processor.

2. A system as defined in claim 1, further including a memory unit containing the discrete samples of the noisy signal.

3. A system as defined in claim 1, in which:
   the source of discrete samples is a sampling circuit having as a sampling input the noisy signal and having as a sampled output the discrete values; and
   the optimization processor is connected to the sampling circuit for applying a sampling rate signal to the sampling circuit.

4. A system as defined in claim 1, in which the compression processor, the decompression processor, and the optimization processor are a single unit.

5. A system for filtering a noisy signal, which includes a desired signal corrupted by random noise, comprising:
   A. discretizing means for generating discrete samples of the noisy signal;

B. compression means for receiving the discrete samples of the noisy signal as an uncompressed input, for generating a compressed representation of an approximation signal that differs from the noisy signal by no more than an adjustable error tolerance, which is a predetermined function of a predetermined error metric and is smaller than the uncompressed input in a predetermined complexity measure;

C. decompression means for receiving the compressed representation of the approximation signal, and for generating the approximation signal as a decompressed output;

D. optimization means for repeatedly applying to the compression means different values of the adjustable error tolerance, for receiving the corresponding compressed representations of the approximation signals, for computing in the predetermined complexity measure the complexity value of the compressed representation obtained for each of the error tolerance values, and for selecting a knee-point tolerance value.

6. A system as defined in claim 5, further including memory means for storing the discrete samples of the noisy signal.

7. A system as defined in claim 5, in which:
the discretizing means is a sampling means for sampling the noisy signal and for generating the discrete samples; and
the optimization means is connected to the sampling means for varying the sampling rate of the sampling means.

8. A method for filtering a noisy signal, which includes a desired signal corrupted by random noise, comprising the following steps:

A. selecting an error metric and a complexity measure;

B. for each of a plurality of error tolerance values, repeating steps C-E as follows:

C. selecting one of the error tolerance values;

D. in a compression processor, generating a compressed data signal that differs from the noisy signal by no more than the selected error tolerance value according to the selected error metric;

E. in an optimization processor, for each generated compressed data signal, calculating a corresponding complexity value using the selected complexity measure;

F. determining a knee-point error tolerance value as the value at which the complexity values have maximum acceleration with respect to the error tolerance value;

G. setting a running error tolerance rate for the compression processor equal to the knee-point error tolerance value; and H. filtering the noisy signal by compressing it in the compression processor with the running error tolerance rate, and decompressing it in a decompression processor.

9. A method as defined in claim 8, further including the following steps:

A. sampling the noisy signal to generate a plurality of noisy discrete values of the noisy signal;

B. storing the plurality of noisy discrete values in a memory circuit;

C. in which the step of generating the compressed data signal in the compression processor includes applying the plurality of stored, noisy discrete values of the noisy signal as input signals to the compression processor.

10. A method as defined in claim 8, in which the maximum acceleration of the complexity values is determined by generating a bilinear approximation of the relationship between the complexity values and the error tolerance values and picking as the knee-point error tolerance value the error tolerance value corresponding to a breakpoint of the bilinear approximation.

11. A method as defined in claim 8, including the following additional steps:

A. generating discrete values of the noisy signal;

B. generating in the optimization processor a plurality of different sampling rates of the noisy signal and for each of the plurality of sampling rates, repeating step C as follows:

C. for each of the plurality of error tolerance values, repeating steps 1)-3) as follows:

1) selecting one of the error tolerance values;

2) in the compression processor, generating the compressed data signal that differs from the noisy signal by no more than the selected error tolerance value according to a predetermined error metric; and 3) in the optimization processor, for each generated compressed data signal, calculating a corresponding complexity value using a predetermined complexity metric;

D. determining a knee-point error tolerance value as the error tolerance value for which the complexity values for the different sampling rates diverge by more than a predetermined threshold value.

* * * * *